(12) United States Patent
Saito et al.

(10) Patent No.: US 9,030,712 B2
(45) Date of Patent: May 12, 2015

(54) IMAGE PROCESSING APPARATUS, PRINTING APPARATUS, AND IMAGE PROCESSING METHOD

(71) Applicant: Canon Kabushiki Kaisha, Tokyo (JP)

(72) Inventors: Senichi Saito, Funabashi (JP); Akitoshi Yamada, Yokohama (JP); Tomokazu Ishikawa, Yokohama (JP); Fumitaka Goto, Tokyo (JP); Nobutaka Miyake, Yokohama (JP); Mitsuhiro Ono, Tokyo (JP); Ryosuke Iguchi, Kawasaki (JP); Hidetsugu Kagawa, Kawasaki (JP); Junichi Nakagawa, Tokyo (JP)

(73) Assignee: Canon Kabushiki Kaisha, Tokyo (JP)

(\*) Notice: Subject to any disclaimer, the term of this patent is extended or adjusted under 35 U.S.C. 154(b) by 0 days.

(21) Appl. No.: 14/076,647

(22) Filed: Nov. 11, 2013

(65) Prior Publication Data

US 2014/0139854 A1    May 22, 2014

(30) Foreign Application Priority Data

Nov. 16, 2012   (JP) .................................. 2012-252267

(51) Int. Cl.
*H04N 1/46*    (2006.01)

(52) U.S. Cl.
CPC ....................................... *H04N 1/46* (2013.01)

(58) Field of Classification Search
None
See application file for complete search history.

(56) References Cited

U.S. PATENT DOCUMENTS

| | | | |
|---|---|---|---|
| 6,025,929 A | | 2/2000 | Nakajima et al. |
| 6,690,484 B1 * | | 2/2004 | Borrell et al. .................. 358/1.9 |
| 2007/0171247 A1 * | | 7/2007 | Kitagawa ........................ 347/15 |

FOREIGN PATENT DOCUMENTS

JP    10-13674 A    1/1998

OTHER PUBLICATIONS

U.S. Appl. No. 14/076,710, filed Nov. 11, 2013, Inventors: Ryosuke Iguchi, Nobutaka Miyake, Akitoshi Yamada, Mitsuhiro Ono, Fumitaka Goto, Hidetsugu Kagawa, Tomokazu Ishikawa, Junichi Nakagawa, and Senichi Saito.
U.S. Appl. No. 14/076,608, filed Nov. 11, 2013, Inventors: Akitoshi Yamada, Tomokazu Ishikawa, Senichi Saito, Fumitaka Goto, Nobutaka Miyake, Mitsuhiro Ono, Ryosuke Iguchi, Hidetsugu Kagawa, and Junichi Nakagawa.
U.S. Appl. No. 14/076,719, filed Nov. 11, 2013, Inventors: Junichi Nakagawa, Mitsuhiro Ono, Hidetsugu Kagawa, Nobutaka Miyake, Akitoshi Yamada, Fumitaka Goto, Ryosuke Iguchi, Tomokazu Ishikawa, and Senichi Saito.
U.S. Appl. No. 14/076,622, filed Nov. 11, 2013, Inventors: Fumitaka Goto, Akitoshi Yamada, Tomokazu Ishikawa, Senichi Saito, Nobutaka Miyake, Mitsuhiro Ono, Ryosuke Iguchi, Hidetsugu Kagawa, and Junichi Nakagawa.

\* cited by examiner

*Primary Examiner* — Kimberly A Williams
(74) *Attorney, Agent, or Firm* — Fitzpatrick, Cella, Harper & Scinto

(57) ABSTRACT

Nozzles in a print head are arrayed in a density of 600 dpi. Moreover, a dither matrix has a size of 16 pixels×16 pixels in 600 dpi. The dither matrix is repeatedly used. In the meantime, each of rectangles represents an HS processing unit. WHS=3 pixels. As a consequence, the relationship of a least common multiple below is established in a nozzle array direction: 3×WD=16×WHS. In this case, the cycle of interference unevenness can be prolonged to the least common multiple between WD and WHS, that is, 48 pixels (3WD). In this manner, the size of the dither matrix is not an integral multiple of the HS processing unit width, so that the cycle of interference unevenness can be prolonged more than the size of the dither matrix. Thus, the interference unevenness can be hardly recognized.

11 Claims, 16 Drawing Sheets

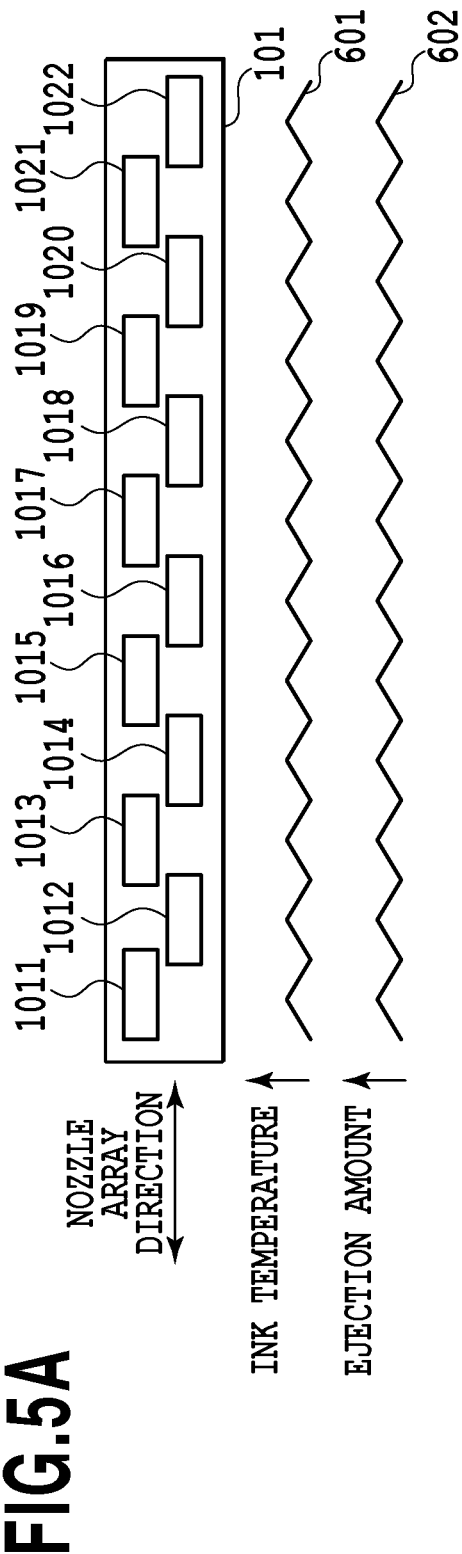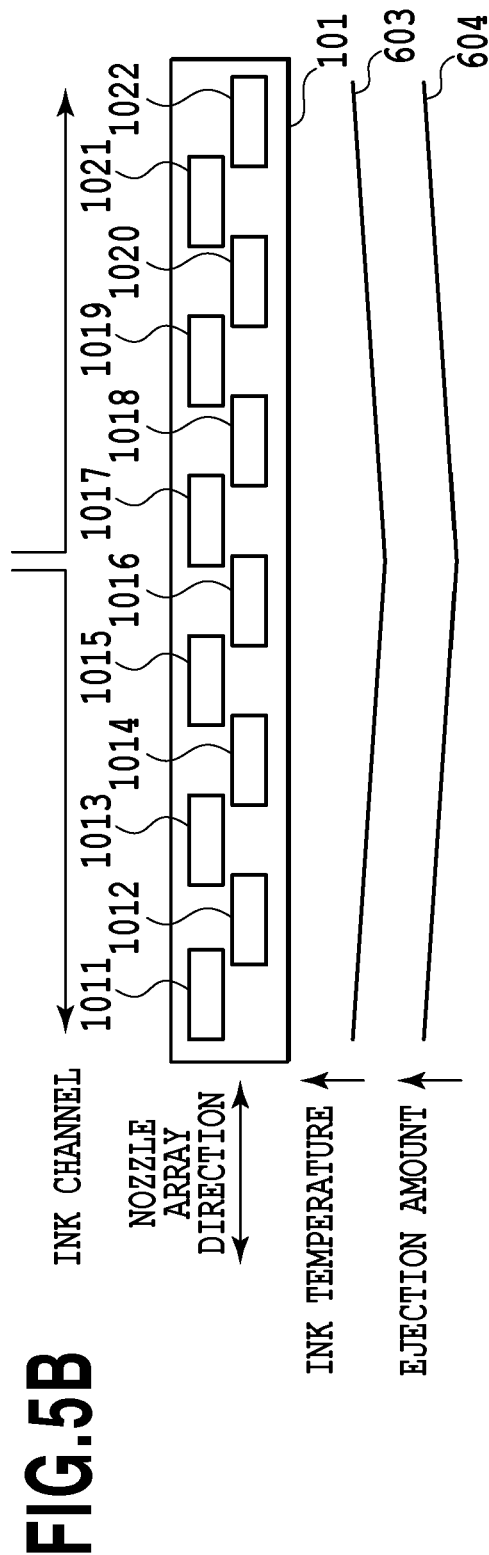

IMAGE PROCESSING APPARATUS, PRINTING APPARATUS, AND IMAGE PROCESSING METHOD

BACKGROUND OF THE INVENTION

1. Field of the Invention

The present invention relates to an image processing apparatus, a printing apparatus, and an image processing method. More particularly, the present invention relates to correction for suppressing an uneven density caused by variations of print characteristics of printing elements, the correction being performed in an image processing system for performing quantization with a dither matrix.

2. Description of the Related Art

The head shading (abbreviated as "HS") technique disclosed in Japanese Patent Application Laid-open No. H10-13674(1998) has been known as one example of the correction for suppressing an uneven density of the aforementioned type. This HS technique is adapted to perform correcting based on information on ink ejection characteristics (i.e., print characteristics) of each of nozzles serving as printing elements. For example, in response to information that amount of ink to be ejected by a certain nozzle is more than normal amount, image data is corrected so as to decrease a gradation value indicated by the image data corresponding to the nozzle. In contrast, in response to information that amount of ink to be ejected by a certain nozzle is less than the normal amount, image data is corrected so as to increase a gradation value indicated by the image data corresponding to the nozzle. In this manner, the number of ink dots to be eventually printed is increased or decreased, so that the density of a print image formed based on the image data can become substantially even in each of the nozzles.

In the case where a processing unit for correction by the HS technique is composed of a plurality of print elements, that is, a plurality of print elements whose data is to be corrected based on one and the same correction data, the correction data is generally based on a result obtained by averaging print characteristics of the plurality of print elements. Therefore, an image printed by the plurality of print elements based on the print data after the HS processing per processing unit based on the average correction data comes to have a difference in density according to a difference in print characteristics among the plurality of print elements, if any. This difference in density appears, on an image, as density unevenness in a cycle of a processing unit width. In the meantime, a dither matrix to be used for quantizing the data after the HS processing may induce a cyclic pattern of a density distribution on a print image according to its threshold pattern.

Normally, the above-described density unevenness in the cycle of the HS processing unit width or the above-described cyclic pattern of the density distribution due to the dither matrix is designed on an unrecognizable level. However, if the cycle of an HS processing unit width is synchronous with the cycle of a dither matrix, interference unevenness that the density unevenness in the cycle of the HS processing unit width emphasizes the cyclic pattern of the dither matrix in the synchronous cycle may be recognized. Such interference unevenness degrades a quality of a print image.

SUMMARY OF THE INVENTION

An object of the present invention is to provide an image processing apparatus, a printing apparatus, and an image processing method that allow interference unevenness caused by the synchronism between a cycle of a processing unit width for correction such as HS processing and a cycle of a dither matrix to be hardly recognized.

In a first aspect of the present invention, there is provided an image processing apparatus that generates print data used for performing printing by using a printing element array in which a plurality of printing elements are arrayed, the apparatus comprising: a correction unit configured to, for each of processing units corresponding to a plurality of printing element groups respectively which are obtained by dividing the plurality of printing elements in the printing element array, correct image data of a pixel, which corresponds to the printing element in the printing element group, according to print characteristics of the printing element in the printing element group; and a quantizing unit configured to quantize the image data corrected by the correction unit by using a dither matrix, wherein one of the number of pixels expressing a cycle of a threshold arrangement pattern, which is formed with thresholds in the dither matrix, in an array direction of the plurality of printing elements and the number of pixels in the array direction corresponding to the plurality of printing elements in the printing element group as a processing unit is not an integral multiple of the other.

In a second aspect of the present invention, there is provided a printing apparatus that performs printing by using a print head provided with a printing element array in which a plurality of printing elements are arrayed based on print data, the apparatus comprising: a correction unit configured to, for each of processing units corresponding to a plurality of printing element groups respectively which are obtained by dividing the plurality of printing elements in the printing element array, correct image data of a pixel, which corresponds to the printing element in the printing element group, according to print characteristics of the printing element in the printing element group; and a quantizing unit configured to quantize the image data corrected by the correction unit by using a dither matrix, wherein one of the number of pixels expressing a cycle of a threshold arrangement pattern, which is formed with thresholds in the dither matrix, in an array direction of the plurality of printing elements and the number of pixels in the array direction corresponding to the plurality of printing elements in the printing element group as a processing unit is not an integral multiple of the other.

In a third aspect of the present invention, there is provided an image processing method for generating print data used for performing printing by using a printing element array in which a plurality of printing elements are arrayed, the method comprising: a correction step of, for each of processing units corresponding to a plurality of printing element groups respectively which are obtained by dividing the plurality of printing elements in the printing element array, correcting image data of a pixel, which corresponds to the printing element in the printing element group, according to print characteristics of the printing element in the printing element group; and a quantizing step of quantizing the image data corrected in the correction step by using a dither matrix, wherein one of the number of pixels expressing a cycle of a threshold arrangement pattern, which is formed with thresholds in the dither matrix, in an array direction of the plurality of printing elements and the number of pixels in the array direction corresponding to the plurality of printing elements in the printing element group as a processing unit is not an integral multiple of the other.

With the above-described configuration, the number of pixels expressing a cycle of a threshold arrangement pattern in an array direction of a plurality of print elements and the number of pixels in the array direction corresponding to the plurality of print elements in a print element group as a processing unit for correction when a dither matrix is used, establish the relationship in which one of the numbers is not an integral multiple of the other. Consequently, it is possible to prolong the cycle of interference unevenness caused by an interference between the pattern cycle of the dither matrix and the cycle of the processing unit for the correction. Thus, it is possible to allow the interference unevenness to be hardly recognized.

Further features of the present invention will become apparent from the following description of exemplary embodiments with reference to the attached drawings.

BRIEF DESCRIPTION OF THE DRAWINGS

FIGS. 5A and 5B are diagrams illustrating the relationship of an ink temperature distribution to an ejection amount distribution that is monotonically increased or decreased according to the ink temperature distribution in a print head to be used in the present embodiment;

DESCRIPTION OF THE EMBODIMENTS

Hereinafter, embodiments of the present invention will be explained in detail with reference to the attached drawings.

Figure 1:
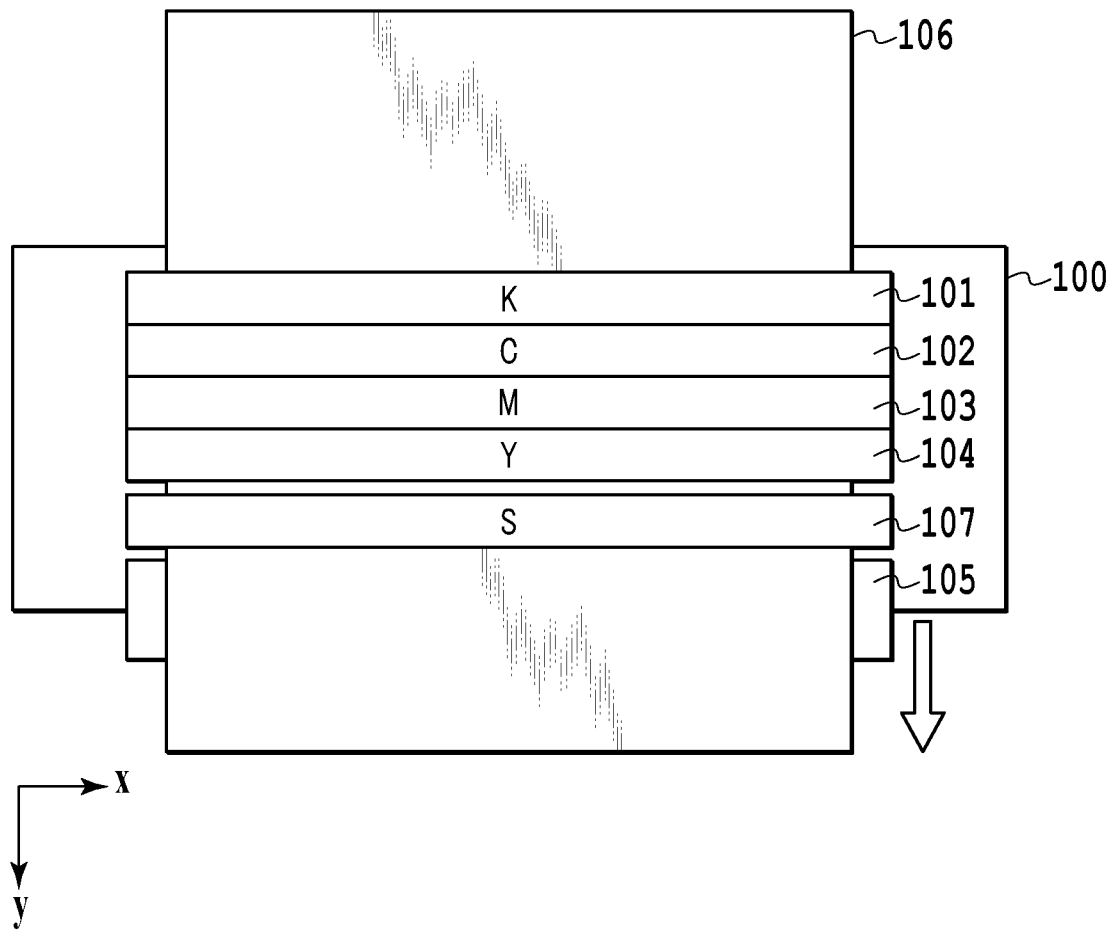
FIG. 1 is a view schematically showing a printer exemplifying an ink jet printing apparatus according to one embodiment of the present invention.

FIG. 1 is a view schematically showing an ink jet printer exemplifying an ink jet printing apparatus of the present invention. The printer in the present embodiment is a printing apparatus of a full line type, and it is provided with print heads 101 to 104, as shown in FIG. 1. Each of the print heads 101 to 104 includes nozzle arrays (i.e., printing element arrays), which correspond to the width of a print medium 106 and has a plurality of nozzles serving as printing elements for ejecting the same kind of ink, the nozzles being arrayed in an x direction, as described later with reference to FIG. 2. The print heads 101 to 104 eject black (K), cyan (C), magenta (M), and yellow (Y) inks, respectively. The print heads 101 to 104 for ejecting the plurality of kinds of inks are arranged in a y direction that is a conveyance direction of the print medium.

Figure 2:
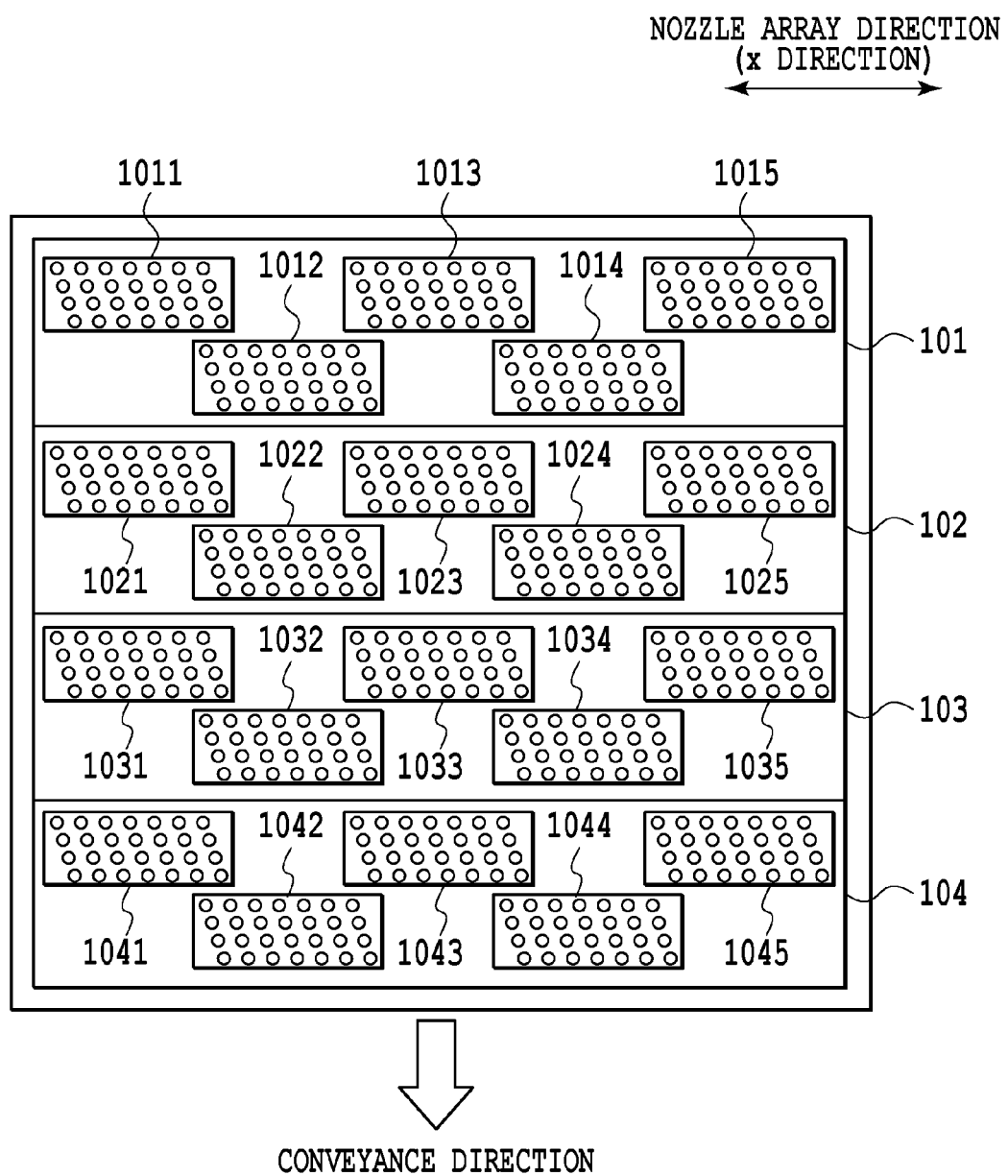
FIG. 2 is a diagram illustrating the details of nozzle arrays in each of print heads 101 to 104 shown in FIG. 1.

FIG. 2 is a diagram illustrating the details of nozzle arrays in each of the print heads 101 to 104. As illustrated in FIG. 2, a plurality of ejection boards (1011 to 1015, 1021 to 1025, 1031 to 1035, and 1041 to 1045) are arranged at the print heads 101 to 104, respectively. Each of the ejection boards is provided with nozzles, a heater for generating thermal energy for the purpose of ejection, an ink passage, and the like. In each of the print heads 101 to 104, one of the ejection boards has four nozzle arrays consisting of a plurality of nozzles arrayed at 150 dpi in the x direction in FIG. 2 in four rows at a distance equivalent to 600 dpi separated from each other. Moreover, the four ejection boards are arranged in the x direction such that the nozzle arrays partly overlap. In this manner, the nozzle arrays, each consisting of the plurality of nozzles arrayed in a density of 600 dpi as a whole in the x direction, are configured in each of the print heads. For the sake of simplification of the illustration, the nozzle array obtained by combining the nozzles in the four rows is represented by the nozzles in a single row in a density of 600 dpi in FIGS. 9 and 15, described later.

Referring to FIG. 1 again, the print medium 106 is conveyed in the y direction crossing the x direction in FIG. 1 when a conveyance roller 105 (and other rollers, not shown) is rotated by the driving force of a motor, not shown. During the conveyance of the print medium 106, ink is ejected from the plurality of nozzles in each of the print heads 101 to 104 based on print data at a frequency corresponding to the conveyance speed of the print medium 106. Consequently, dots of each color are formed at a predetermined resolution based on the print data, and then, an image is printed on the print medium 106.

Figure 8A:
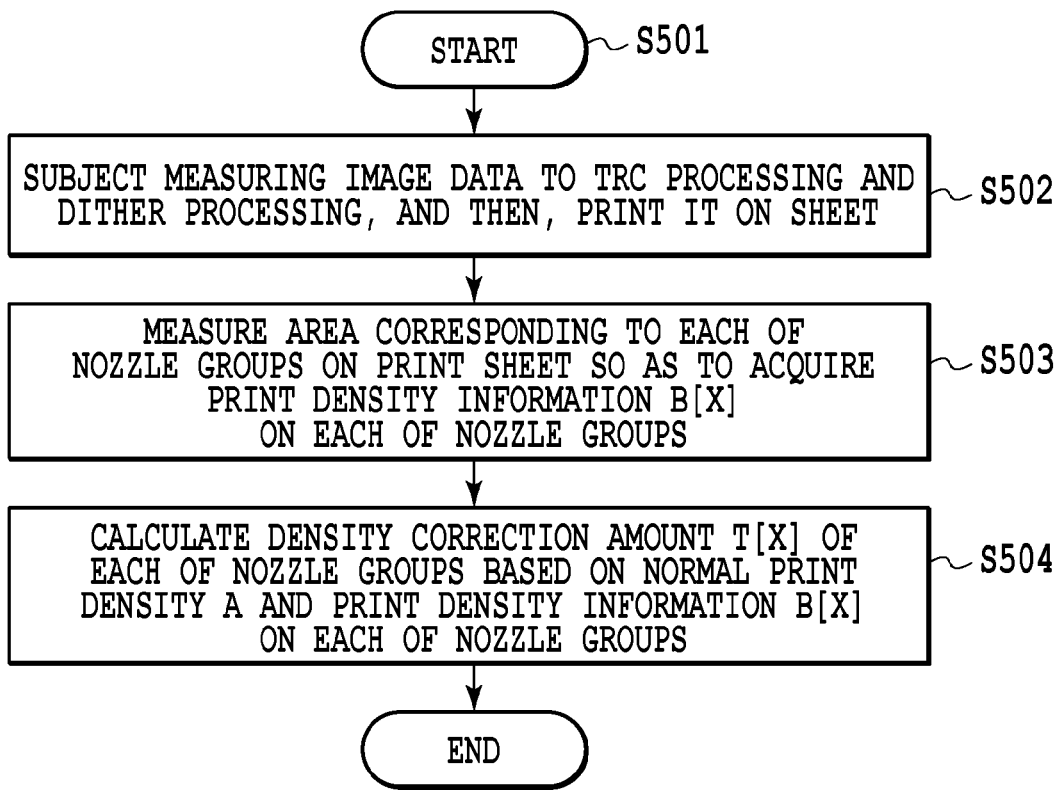
FIGS. 8A and 8B are flowcharts explanatory of processing for creating parameters of a table for use in an HS processing part 406 illustrated in FIG. 4 and image processing with the parameters created during an actual printing operation, respectively.

A scanner 107 is provided downstream, in the conveyance direction, of the print heads 101 to 104 arranged in the y direction. The scanner 107 has reading elements arranged at a predetermined pitch in the x direction, and thus, is used for reading an image, for example, reading the density of a patch printed on the print medium when a correction parameter for HS (abbreviating "head shading"), described later with reference to FIG. 8A, is generated. And then, the scanner 107 outputs RGB data as a reading result.

Incidentally, a printing apparatus, to which the present invention is applicable, is not limited to the above-described full-line type apparatus. For example, the present invention is applicable also to a so-called serial type printing apparatus in which print heads are configured in such a manner as to scan a print medium in a direction crossing a conveyance direction of a print medium so as to print the image. Moreover, although the print heads are provided in a manner corresponding to the ink colors in the present embodiment, a single print head may eject a plurality of color inks. Furthermore, nozzle arrays corresponding to a plurality of color inks may be arrayed on a single ejection board.

Figure 3:
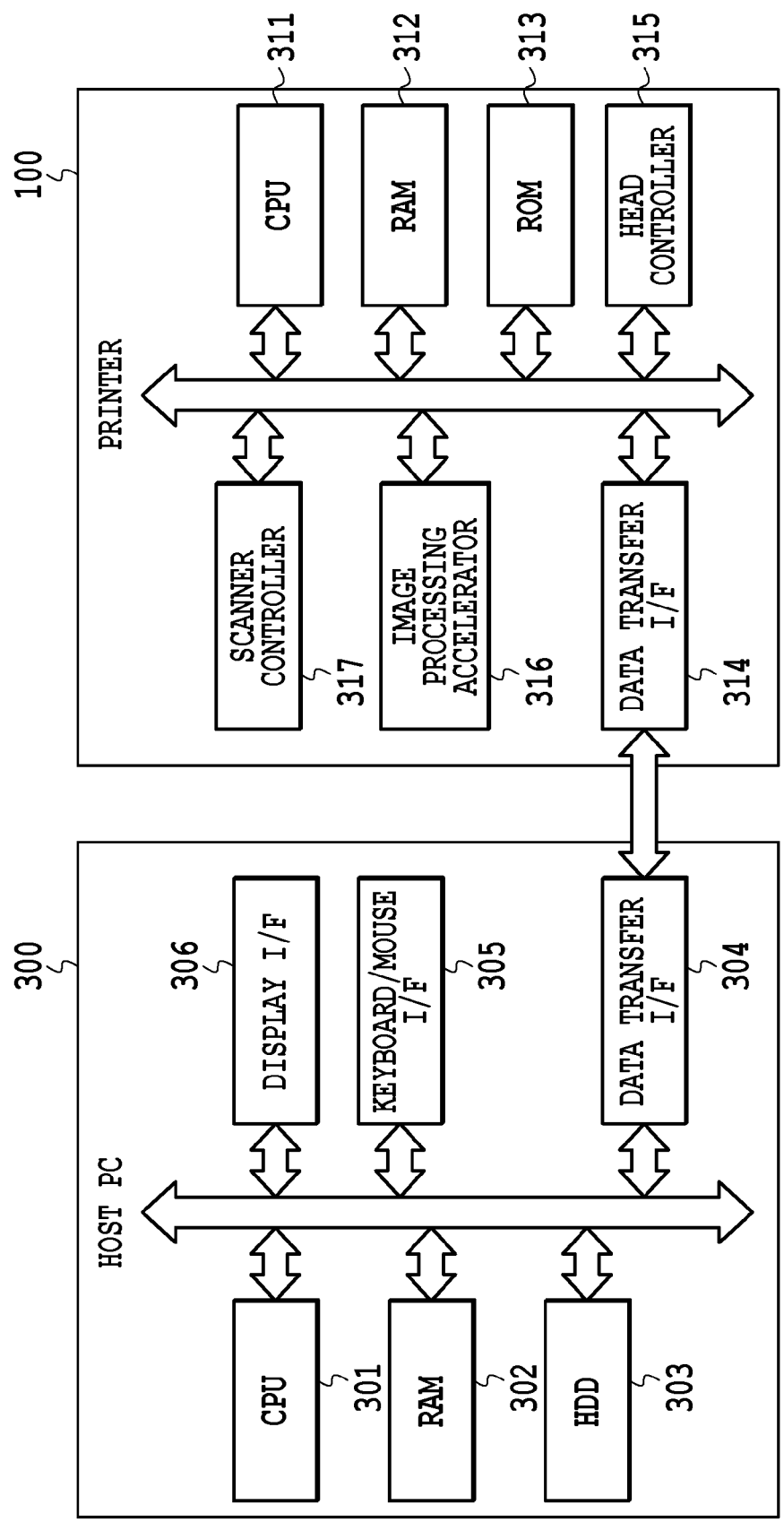
FIG. 3 is a block diagram illustrating a printing system including the printer shown in FIG. 1 and a personal computer (abbreviated as a "PC") 300 as a host apparatus.

FIG. 3 is a block diagram illustrating a printing system including the printer shown in FIG. 1 and a personal computer (abbreviated as a "PC") 300 serving as a host apparatus.

The host PC 300 principally includes the following constituent elements. A CPU 301 performs processing in accordance with a program stored in an HDD 303 or a RAM 302 serving as a storing part. The RAM 302 is a volatile storing part, for temporarily storing a program or data therein. In the meantime, the HDD 303 is a non-volatile storing part, for storing a program or data therein in the same manner. A data transfer I/F (abbreviating an "interface") 304 is adapted to control the transmission or reception of data to or from a printer 100. This data transmission or reception connecting system is achieved by using a USB, IEEE1394, a LAN, or the like. A keyboard/mouse I/F 305 is designed to control an HID (abbreviating a "human interface device") such as a keyboard or a mouse. A user can input data via the I/F 305. A display I/F 306 controls displaying by a display, not shown.

In the meantime, the printer 100 principally includes the following constituent elements. A CPU 311 performs processing in an embodiment regarding the HS, described later, in accordance with a program stored in a ROM 313 or a RAM 312. The RAM 312 is a volatile storing part, for temporarily storing a program or data therein. The ROM 313 is a non-volatile storing part capable of storing therein table data or a program to be used in the HS, described later.

A data transfer I/F 314 controls the transmission or reception of data to or from the PC 300. A head controller 315 supplies print data to each of the print heads 101 to 104 shown in FIG. 1, and controls an ejecting operation by the print heads. Specifically, the head controller 315 reads a control parameter and print data stored at a predetermined address of the RAM 312. When the CPU 311 writes the control parameter and the print data at the predetermined address of the RAM 312, the head controller 315 starts processing so as to eject ink from the print head. A scanner controller 317 controls each of the reading elements in the scanner 107 shown in FIG. 1, and then, outputs the RGB data obtained by the reading elements to the CPU 311.

An image processing accelerator 316 is hardware capable of performing image processing at a speed higher than that of the CPU 311. Specifically, the image processing accelerator 316 reads a parameter and data required for the image processing from a predetermined address of the RAM 312. When the CPU 311 writes the parameter and data at the predetermined address of the RAM 312, the image processing accelerator 316 is started up to cause the data to be subjected to predetermined image processing. In the present embodiment, software executed by the CPU 311 performs processing of creating parameters of a correction table to be used in an HS processing part, described later. In the meantime, the hardware of the image processing accelerator 316 performs image processing at the time of printing including the processing by the HS processing part. Here, the image processing accelerator 316 is not an essential constituent element. Therefore, it is to be understood that only the CPU 311 may perform the table parameter creation and the image processing according to the specifications of a printer.

Figure 4:
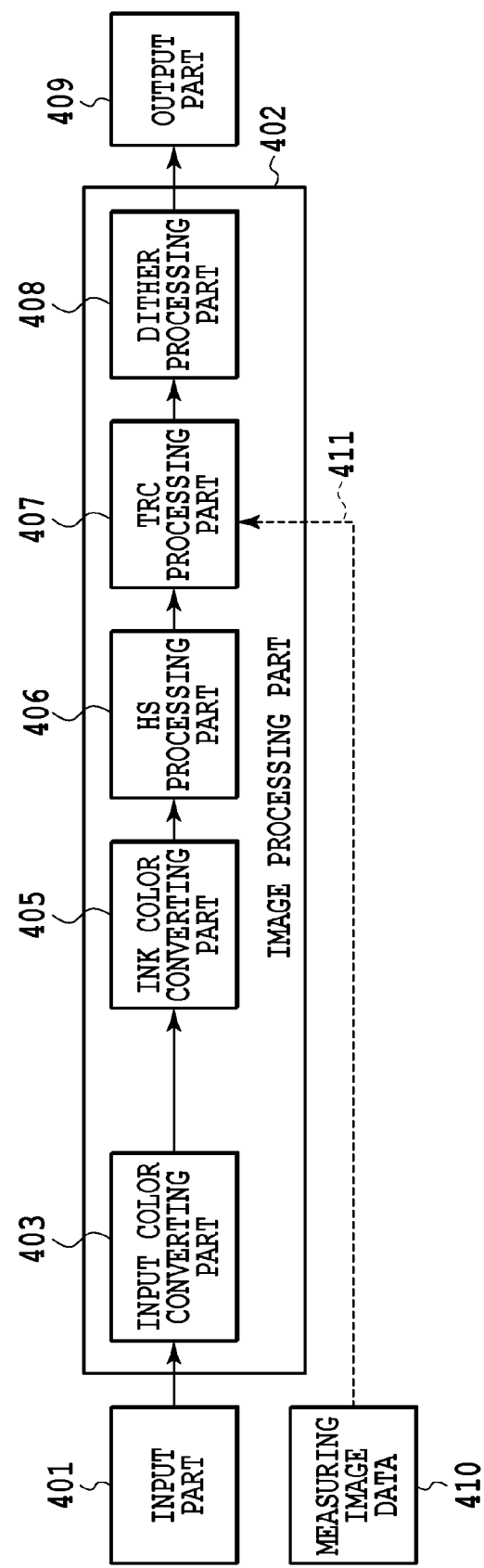
FIG. 4 is a block diagram illustrating the structure of image processing to be performed by an ink jet printer according to a first embodiment of the present invention.

FIG. 4 is a block diagram illustrating the structure of image processing to be performed by an ink jet printer according to a first embodiment of the present invention. That is to say, an image processing part of the present embodiment is made up of the elements required for controlling and processing in the printer 100 illustrated in FIG. 3. Here, it should be construed that the present invention is applicable to not only this configuration but also other configurations. For example, the image processing part may be made up of the elements in the PC 300 illustrated in FIG. 3. Alternatively, a part of the image processing may be made up of elements of the PC 300 whereas the other parts of the image processing part may be made up of the elements of the printer 100. Such image processing parts will be referred to as an image processing apparatus in the present specification.

As shown in FIG. 4, an input part 401 outputs image data received from the host PC 300 to an image processing part 402. The image processing part 402 is constituted by including an input color converting part 403, an ink color converting part 405, an HS processing part 406, a TRC (abbreviating "tone reproduction curve") processing part 407, and a dither processing part 408.

In the image processing part 402, first, the input color converting part 403 converts the input image data received from the input part 401 into image data according to a color reproduction area by the printer. In the present embodiment, the input image data represents color coordinates (R, G, B) in color space coordinates based on the sRGB that indicates colors represented on a monitor. The input color converting part 403 converts the R, G, and B input image data, each having 8 bits, into image data (R', G', B') corresponding to the color reproduction area by the printer by a known technique such as matrix operation or processing using a three-dimensional look-up table (abbreviated as a "3DLUT"). In the present embodiment, interpolation is performed simultaneously with the processing using the 3DLUT, thus achieving the conversion. Here, the resolution of the 8-bit image data to be processed in the image processing part 402 in the present embodiment is 600 dpi, and further, the resolution of binary data obtained by quantization in the dither processing part 408 also is 600 dpi.

The ink color converting part 405 converts the R, G, and B image data, each having 8 bits, processed by the input color converting part 403 into image data that is color signal data on ink to be used in the printer. Since the printer 100 in the present embodiment uses black (K), cyan (C), magenta (M), and yellow (Y) inks, the image data on an RGB signal is converted into image data consisting of 8-bit color signals representing K, C, M, and Y inks. This color conversion also is achieved by simultaneously using an interpolating operation with the 3DLUT in the same manner as the above-described processing by the input color converting part 403. Here, the technique of a matrix operation or the like may be used as another converting technique in the same manner as described above.

The HS (Head shading) processing part 406 receives the image data on the ink color signal and subjects the 8-bit data per ink color to correction according to the ejection characteristics (print characteristics) of each of the nozzles constituting the print head. The number of pixels indicating a processing unit in the HS processing part 406 is an integral multiple of the size of a dither matrix (i.e., the number of pixels) to be used in the dither processing part 408, as described later with reference to FIG. 8A and the like.

The TRC (Tone Reproduction Curve) processing part 407 subjects the image data consisting of the 8-bit ink color signals that have been subjected to the HS processing to correction for adjusting the number of dots to be printed by an output part 409 per ink color. In general, no linear relationship is built between the number of dots to be printed on a print medium and an optical density achieved by the print medium with the number of dots. Consequently, the TRC processing part 407 adjusts the number of dots to be printed on a print medium by correcting the 8-bit image data, so as to build the linear relationship.

The dither processing part 408 quantizes the 256-value and 8-bit image data on the ink color, the image data having been processed in the TRC processing part 407, thereby generating binary data of 1 bit, in which "1" indicates printing whereas "0" indicates non-printing. Incidentally, the present invention is not limited to a configuration in which the 8-bit image data is converted directly into binary data (i.e., dot data). For example, the 8-bit image data may be once quantized to multi-valued data consisting of several bits, and in the end, may be converted into binary data with a dot arrangement pattern.

The output part 409 drives the print head to eject each color ink onto the print medium for performing printing based on the binary data (i.e., the dot data) obtained by the quantization. In the present embodiment, the output part 409 includes a print mechanism provided with the print heads 101 to 104 shown in FIG. 1.

First Embodiment

A description will be given below of a first embodiment of the present invention, in which interference unevenness caused by the synchronism between a cyclic pattern according to the size of a dither matrix and a cycle of density unevenness in HS processing unit width is hardly recognized in the above-described print system.

As described above, when the cyclic pattern of the size of a dither matrix is synchronized with the cycle of density unevenness in HS processing unit width, density unevenness is caused by mutual interference therebetween. Although the cyclic pattern of the size of a dither matrix and the cycle of density unevenness in HS processing unit width are independently designed in such a manner as not to induce any problems, the mutual interference may cause density unevenness that is conspicuously recognized. First of all, this problem will be explained.

The cyclic pattern of the size of a dither matrix will be described below.

The ordered dither method is classified into two broad categories: a concentrated dot dither method and a dispersion dot dither method. Moreover, one dither pattern is repeatedly used with respect to a print image in a two-dimensional fashion. In the dispersion dot dither method, a cyclic pattern as a cycle of a matrix size may be recognized in a low gradation region of a print image. Additionally, even with blue noise dithering that is one type of dispersion dot dithering, after the matrix is repeatedly used, a cyclic pattern may appear in a low gradation image region. In the meantime, in the concentrated dot dither method, a cyclic pattern appears in a cycle of a matrix size irrespective of gradations. For example, in the case of 600 dpi, a cycle is 0.68 mm in a size of 16×16, and further, a cycle is 10. 8 mm in a size of 256×256. In this manner, the dither matrix used in the ordered dither method may induce the cyclic pattern on a print image in a cycle of a matrix size.

Next, density unevenness in cycle of an HS processing unit width will be described below.

In HS processing, correction is performed such that image data per processing unit corresponding to each of nozzle groups obtained by grouping a plurality of nozzles as print elements in a nozzle array direction is converted with reference to a conversion table. In this manner, it is possible to reduce density unevenness caused by ejection characteristics (i.e., variations) of the nozzles as the print elements. The minimum size of the processing unit corresponds to one nozzle. Here, in consideration of a processing speed or a memory capacity, the processing unit should desirably correspond to a plurality of nozzles. For example, in consideration of shortening a scan time by a scanner when parameters for the HS processing are created, it is desirable to enlarge an area of a read region in order to improve an S/N ratio of a read value. From this point of view, the processing unit should desirably correspond to a plurality of nozzles. In such a case, ejection characteristics are possibly varied among the plurality of nozzles corresponding to the processing unit. To the contrary, in the HS processing, average ejection amount of the plurality of nozzles in the processing unit, for example, is acquired, and then, all of the nozzles within the processing unit are uniformly corrected with a correction value based on the average ejection amount.

However, when the image data corresponding to each of the plurality of nozzles is subjected to the above-described HS processing with the correction value based on the average ejection amount in the case where the ejection amount distribution of the nozzles within the processing unit is monotonically increased or decreased, density unevenness may appear on a print image based on the corrected print data in a cycle of a width of a nozzle group corresponding to the processing unit (hereinafter simply referred to as also a "processing unit width").

Figure 6:
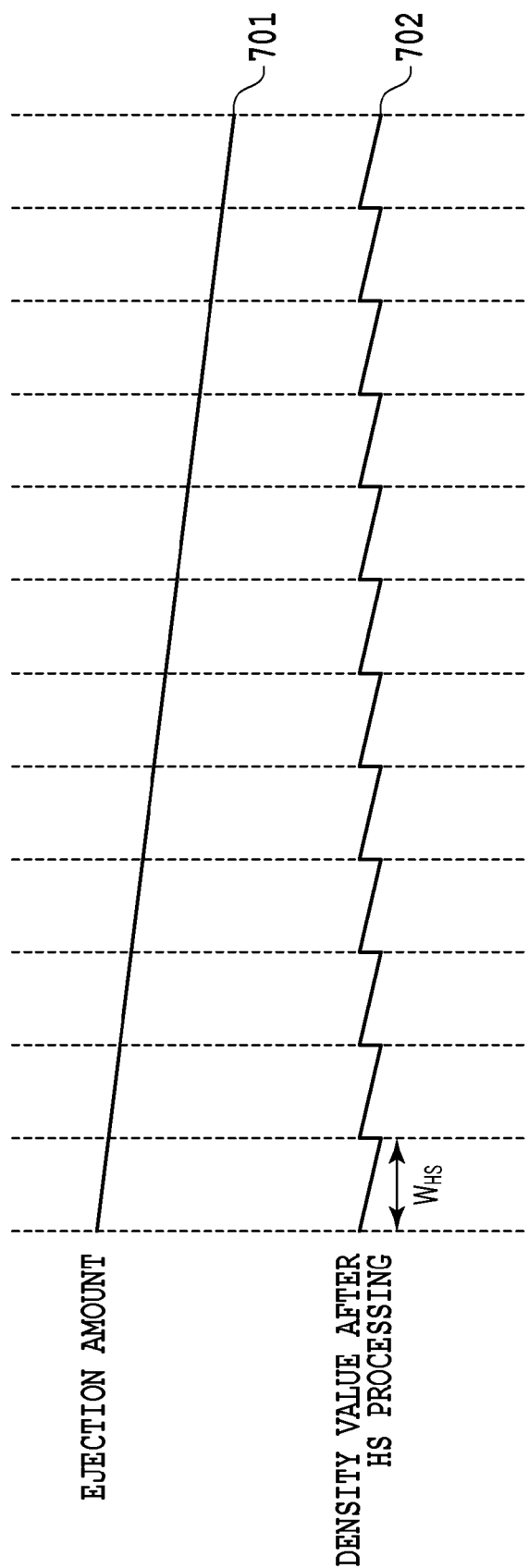
FIG. 6 is a diagram explanatory of density unevenness caused in a cycle of a processing unit width according to the ejection amount distribution that is monotonically increased or decreased.

FIGS. 5A and 5B are diagrams illustrating the relationship of an ink temperature distribution to an ejection amount distribution that is monotonically increased or decreased according to the ink temperature distribution in a print head to be used in the present embodiment. Furthermore, FIG. 6 is a diagram explanatory of density unevenness caused in a cycle of a processing unit width according to the ejection amount distribution that is monotonically increased or decreased.

FIG. 5A illustrates an ejection amount distribution caused by an increase in temperature of ink in each of the ejection boards 1011 to 1022 arranged on the print head 101 for one ink color (i.e., K ink in the illustration). Heat in each of the ejection boards can more hardly escape nearer the center, and therefore, the ink temperature distribution becomes highest near the center of the ejection board. As a consequence, an ink temperature distribution 601 depicts a crest having a vertex near the center of the ejection board. Accordingly, an ejection amount distribution 602 also depicts a similar crest corresponding to each of the ejection boards. In this manner, from left to right in FIG. 5A, the ejection amount distribution in each of the ejection boards is monotonically increased, and then, is monotonically decreased.

In the meantime, FIG. 5B illustrates an ejection amount distribution caused by an increase in temperature of ink in the print head. Specifically, the line type print head in the present embodiment circulates ink through an ink channel formed in the width direction of the print head while supplying the ink to each of the nozzles. In the ink channel, the ink starts flowing from the center of the print head 101 rightward and leftward through the print head 101, and then, reaches both ends of the print head. As the ink moves rightward and leftward through the ink channel, the ink absorbs the heat of the ejection board and the like, and thus, its temperature is increased. Consequently, an ink temperature distribution 603 is monotonically increased from upstream to downstream of the ink channel. According to the ink temperature distribution, an ejection amount distribution 604 is monotonically increased in the same manner. In this manner, the ejection amount distribution is monotonically increased or decreased by the influence of the increase in temperature of the ink in the print head.

Incidentally, the ejection amount distribution may be monotonically increased or decreased according to a negative pressure distribution in the print head or the fabrication process of the print head. The final ejection amount distribution resulting from the synthesis of the above-described distributions is monotonically increased or decreased in the same manner.

FIG. 6 illustrates the density unevenness on the print image based on the print data after the HS processing in a manner corresponding to a part 701 of the ejection amount distribution in the case of the ejection amount distribution that is monotonically increased or decreased, as described above, in the plurality of nozzles arrayed in the print head. As described above, the average ejection amount, for example, per processing unit in the HS processing is acquired, and then, the image data on each of the plurality of nozzles within the processing unit is uniformly corrected with the correction value based on the average ejection amount. Dots are printed on pixels corresponding to the nozzles in the number according to the value of the corrected image data based on ejection data per nozzle that is finally obtained based on the corrected image data. As a consequence, a density value distribution 702 after the HS processing corresponds to nozzles having a smaller correction value and nozzles having a larger correction value than a value to be intended to be corrected with reference to a nozzle having the average ejection amount per processing unit width. Specifically, a jaggy density distribution having the same monotonic decrease as that of the ejection amount distribution 701 can be obtained per processing unit width. That is to say, the density unevenness has the cycle of the processing unit width for the HS processing.

The above-described density unevenness having the cyclic pattern of the size of the dither matrix or the cycle of the HS processing unit width is designed on a level enough to be not recognized. However, in the case of the mutual interference, the edge of the jaggy distribution of the HS processing unit width emphasizes the cyclic pattern of the size of the dither matrix, and the resultant density unevenness may mark a level of conspicuous recognition. In other words, the size of the dither matrix (i.e., the number of pixels) is normally designed to become an integral multiple of the processing unit width for the HS processing (i.e., the number of pixels), thus causing the above-described interference.

Figure 7:
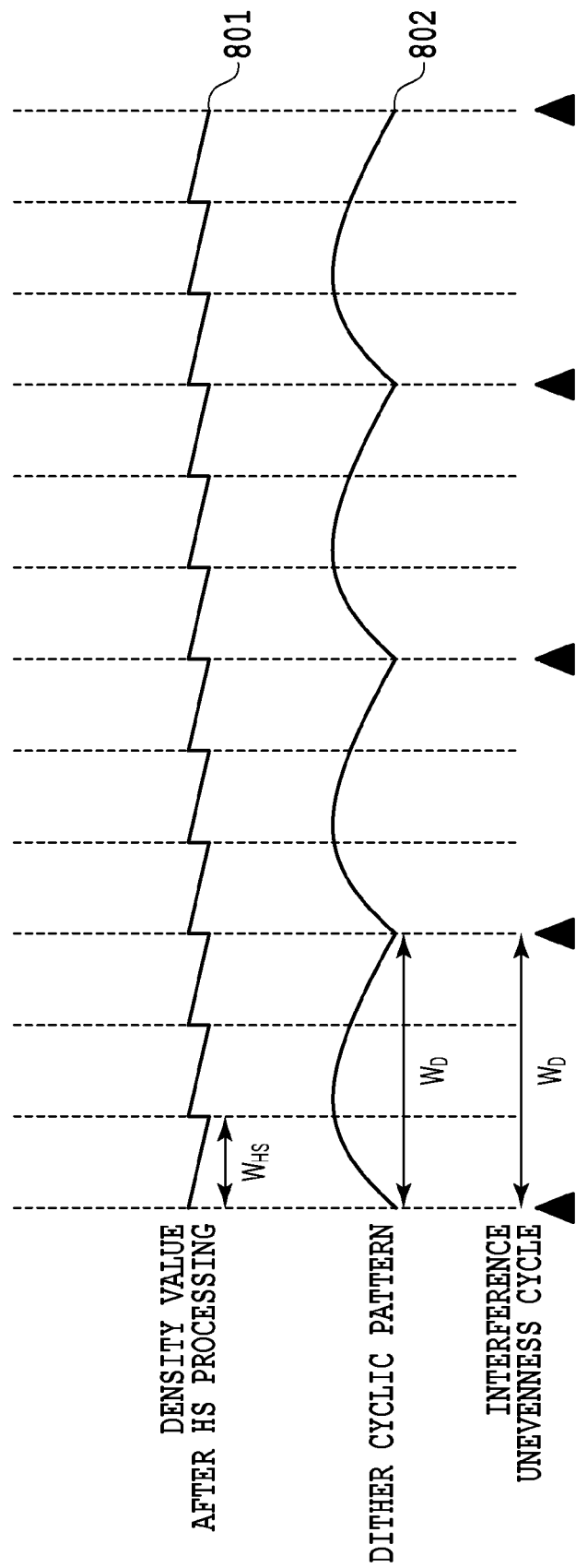
FIG. 7 is a diagram explanatory of, in particular, a cycle of interference unevenness explained with reference to FIG. 6.

FIG. 7 is a diagram explanatory of, in particular, the cycle of the interference unevenness. As illustrated in FIG. 7, a density distribution is caused on a print image based on the print data quantized with a threshold arrangement (i.e., a threshold distribution) in the dither matrix. And then, a cyclic pattern in a cycle having a size WD in the nozzle array direction in the dither matrix is generated according to the density distribution within each of application ranges of the dither matrix. As described above, when the size WD is an integral multiple of an HS processing unit width WHS in the nozzle array direction, the interference unevenness is caused in the cycle WD in the nozzle array direction. The interference unevenness is conspicuously recognized.

The size of a dither matrix is not an integral multiple of an HS processing unit width in the embodiment of the present invention, so that the above-described interference unevenness can be hardly recognized. Explanation will be made below on a first embodiment.

Figure 8B:
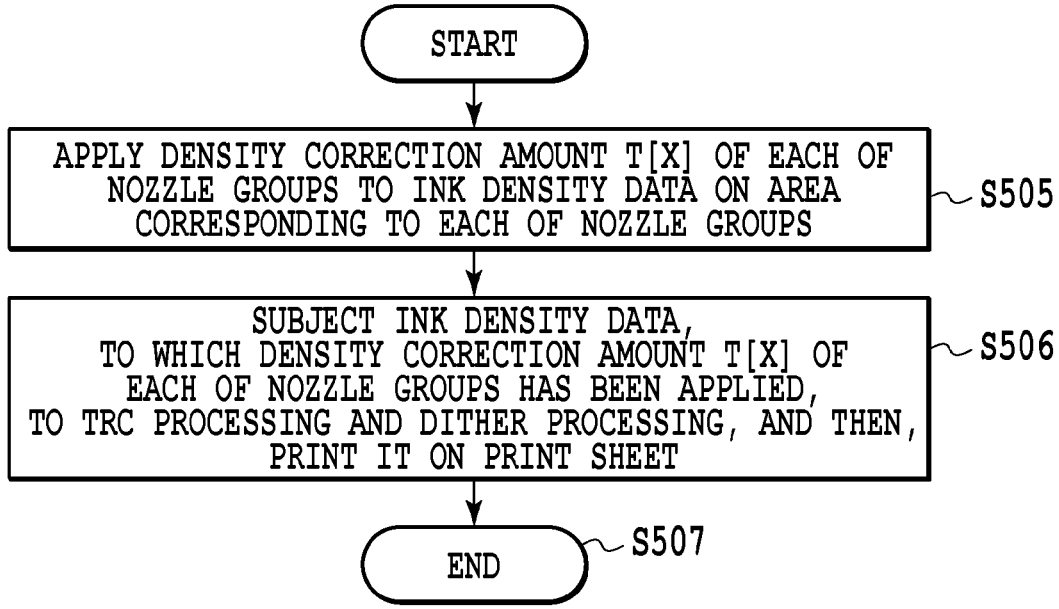

FIGS. 8A and 8B are flowcharts explanatory of processing for generating parameters of a table to be used in the HS processing part 406 illustrated in FIG. 4 and image processing with parameters generated during an actual printing operation, according to the first embodiment of the present invention, respectively.

FIG. 8A illustrates steps executed by the CPU 311 in order to generate parameters of a conversion table as a one-dimensional look-up table to be used in the HS processing part 406 in the present embodiment. In the present embodiment, this parameter generation is forcibly or selectively performed when a printer is fabricated, a printer is used for a predetermined period of time, or a printer performs a printing operation by predetermined amount. Alternatively, the parameter generation may be performed before every printing operation, for example. In other words, this processing can be performed as so-called calibration, thereby updating table parameters contained in a conversion table. Regarding, for example, a nozzle group (i.e., a processing unit) whose ejection amount is measured to be more than normal amount and whose patch density is measured to be higher, the pixel value of image data corresponding to the nozzle group is corrected to become smaller based on the table parameters in the HS processing part, thereby reducing the number of dots to be printed by the nozzle group. In contrast, regarding a nozzle group whose patch density is measured to be lower, the pixel value of image data corresponding to the nozzle group is corrected to become greater.

Upon the start of the table parameter generation used in the HS processing part 406 illustrated in FIG. 8A, first in step S502, the ink is ejected from all of the nozzles of each of the print heads shown in FIG. 1 so as to print a measuring image (i.e., a patch) on a print medium. In this case, a measuring image (i.e., a patch) having a specified one out of signal values 0 to 255 with respect to each of pieces of data C, M, Y, and K is printed.

In printing a patch, measuring image data 510 consisting of ink color signals is used, as illustrated in FIG. 4, unlike a normal printing operation. Specifically, the measuring image data 510 is input directly into the TRC processing part 407 not through the processing in each of the input color converting part 403, the ink color converting part 405, and the HS processing part 406. This route is indicated by a broken line 411 as a bypass route in FIG. 4. Then, the measuring image data corrected in the TRC processing part 407 is subjected to quantization in the dither processing part 408, and then, is sent to the output part 409. Thus, the output part 409 prints a measuring image on the print medium 106.

The size of a dither matrix used in the quantization in the dither processing part 408 does not build the relationship of an integral multiple with respect to a processing unit width (i.e., the number of pixels) in the HS processing part, as described later with reference to FIG. 9. In this manner, the cycle of the interference unevenness can be prolonged more than the size of the dither matrix, and therefore, it can be hardly recognized.

Incidentally, although the image data (C, M, Y, and K) consisting of the ink color signals have been used as the measuring image in the above-described explanation, RGB data may be used, to be subjected to the processing from the input color converting part 403 to the HS processing part 406. In this case, an input is equal to an output in a processing table in the input color converting part 403 or the HS processing part 406. It is preferable that a processing table that is not substantially processed should be set. To the contrary, data dedicated for measurement after the TRC processing may be prepared, so that the dither processing part 408 may first perform processing.

Subsequently in step S503, the scanner 107 measures the measuring image printed on the print medium in step S502, thereby obtaining nozzle group print density information B[X] per area [X] based on the measurement result. Here, the area [X] expresses information that indicates, in the nozzle group (i.e., a print element group) consisting of three nozzles, the positions of the nozzles for each of the colors in the x direction in each of the print heads 101 to 104 shown in FIG. 1. In other words, the HS processing part 506 in the present embodiment performs the HS processing in each nozzle group consisting of three nozzles out of a plurality of nozzles (referred to as a "processing unit" in the present specification). More specifically, the HS processing part 406 corrects, in the same manner, each of the image data on the three pixels having a resolution of 600 dpi with a parameter set per area [X] having a resolution of 200 dpi indicating the processing unit.

A detailed method for acquiring the nozzle group print density information B[X] is as follows: the scanner 107 reads the print density of an area in a patch which is printed by the three nozzles corresponding to the area [X] of each of the ink colors, and then, the 8-bit RGB read data is subjected to the following calculations:

$$C=255-R;$$

$$M=255-G;$$

$$Y=255-B;\text{ and}$$

$$K=255-G,$$

thus obtaining the nozzle group print density information B[X]. Examples of a method for converting the data read by the scanner 107 into print density information may include a known technique such as a method of using a one- or three-dimensional look-up table, in addition to using the difference obtained by subtracting the read value from 255.

Here in the present embodiment, the resolution by the scanner, that is, the arrangement pitch of reading elements arranged in the scanner should not be particularly limited. For example, the resolution by the scanner may be higher than a print resolution of 1200 dpi by the print head. Moreover, the scanner 107 need not always be the same full-line type as the print heads, as shown in FIG. 1. The scanner 107 may be of a serial type for performing colorimetry in a predetermined period of time while moving in the x direction in FIG. 1. Alternatively, the scanner 107 may be prepared separately from the printer. In this case, a signal connection may be made between a scanner and a printer, thereby enabling a measurement result to be automatically input into the printer from the scanner. Additionally, the nozzle group print density information B[X] need not always represent the CMYK density obtained by calculation based on the RGB information. For example, the nozzle group print density information B[X] may have any formats such as L*a*b* measured by a colorimeter. As long as the nozzle group print density information B[X] in the area X corresponding to two nozzles by various kinds of processing such as averaging can be properly obtained, the color may be measured at any resolutions in any formats.

Next in step S504, density correction amount T[X] for the area [X] is calculated based on a standard print density A and the nozzle group print density information B[X] obtained in step S503. Here, the standard print density A signifies a target value of the print density information obtained by printing and measuring a patch in the printer of the present embodiment based on the measuring image data (C, M, Y, and K). Specifically, the target value may be obtained as a result of a process that the scanner 107 measures an image printed by using nozzles for ejecting ink in standard ejection amount, and then, converts the measurement result into print density information.

Specifically, the density correction amount T[X] can be expressed by the following equation.

$$\text{Density correction amount } T[X]=A-B[X]$$

Actually, the value A-B[X] indicating the difference in density on a sheet may not accord with correction amount of ink color density data in the HS processing part 406. In such a case, it is desirable to calculate the density correction amount T[X] based on the difference A-B[X] in density on a sheet according to predetermined conversion. The conversion may be achieved by appropriately using known techniques such as statistically approximate/density estimation and density search. Explanation will be made below on the present embodiment assuming that the density correction amount T[X] is equal to A-B[X].

The density correction amount T[X] is obtained in the above-described manner and is stored in a memory serving as a storing part for each area [X]. The above-described series of processing for generating the density correction amount T[X] is repeated times required for the respective gradation values of C, M, Y, and K, thus creating the density correction amount T[X] of the respective gradation values of C, M, Y, and K.

Incidentally, the above-described series of processing for generating the density correction amount T[X] may not be performed with respect to all of gradations of 0 to 255, but correction values of other gradations may be estimated with reference to generated correction values of gradations. As the density correction amount T[X], the density correction amount may be stored as it is, or an amount corrected by using the density correction amount may be stored. In the case of storing the correction amount, there are advantages that a correction degree is readily modulated or finely adjusted. In contrast, in the case of storing the corrected amount, the calculated value is stored, thereby bringing an advantage of quick processing. Although the value is stored in the HDD 303 in the host PC at this time in the present embodiment, it may be stored in a non-volatile memory provided in the printer. At any rate, the created table parameter should be preferably treated in such a manner as not to be lost at a timing when a power source is turned off, for example.

Next, explanation will be made on processing to be performed by the HS processing part 406 during printing with reference to FIG. 8B. This processing is a part of the processing to be performed by the image processing accelerator 316 as the series of image processing part illustrated in FIG. 4 during the normal printing operation, and is equivalent to the processing performed by the HS processing part 406 illustrated in FIG. 4.

First, the image processing accelerator 316 corrects, in step S505, the image data on the ink colors, which has been subjected to the processing in the input color converting part 403 and the input color converting part 405, by using the table parameter created by the processing described with reference to FIG. 8A, that is, the density correction amount T[X].

Here, it is determined where in the above-described areas [X] an object pixel that is subjected to the image processing is contained. That is, a value X is determined. Here, since each of the areas [X] corresponds to an area of three nozzles of 600 dpi whereas the resolution of a pixel in the image processing is 1800 dpi, the three pixels in the x direction correspond to each of the areas [X].

When the value X of the area [X] containing an object pixel k is obtained as X=n, a density correction amount T[n] created in a manner corresponding to the area [n] is acquired from the table. And then, a density value [k] indicated by image data (C, M, Y, and K) on the object pixel k is corrected with the density correction amount T[n], as follows:

Corrected density value [k]=density value [k]+density correction amount T[n]

Subsequently in step S506, the image processing accelerator 316 subjects the ink density data whose density value is corrected in step S505 to processing by the TRC processing part 407 and the quantizing part 408 that uses the dither matrix described later with reference to FIG. 7. Thereafter, the output part 409 prints dots on the print medium 106 based on the resultant binary data.

In the present embodiment, the above-described size of the dither matrix in the nozzle array direction (i.e., the number of pixels, to which the dither matrix is applied) and the processing unit width are determined such that the size of the dither matrix is not an integral multiple of the processing unit width used in the HS processing part 406. A description will be given below of this.

Explanation will be first made on functions fulfilled when the size of the dither matrix is not an integral multiple of the HS processing unit width. When the size of the dither matrix is designated by WD whereas the HS processing unit width is denoted by WHS, the feature that the size of the dither matrix is not an integral multiple of the processing unit width satisfies the following relationship:

$WD \neq nWHS$ (wherein n is a natural number),
wherein the cycle of the interference unevenness is the least common multiple between WD and WHS.

In contrast, the feature that the size of the dither matrix is an integral multiple of the processing unit width satisfies the following relationship:

$WD = nWHS$, wherein the cycle of the interference unevenness is WD.

Figure 9:
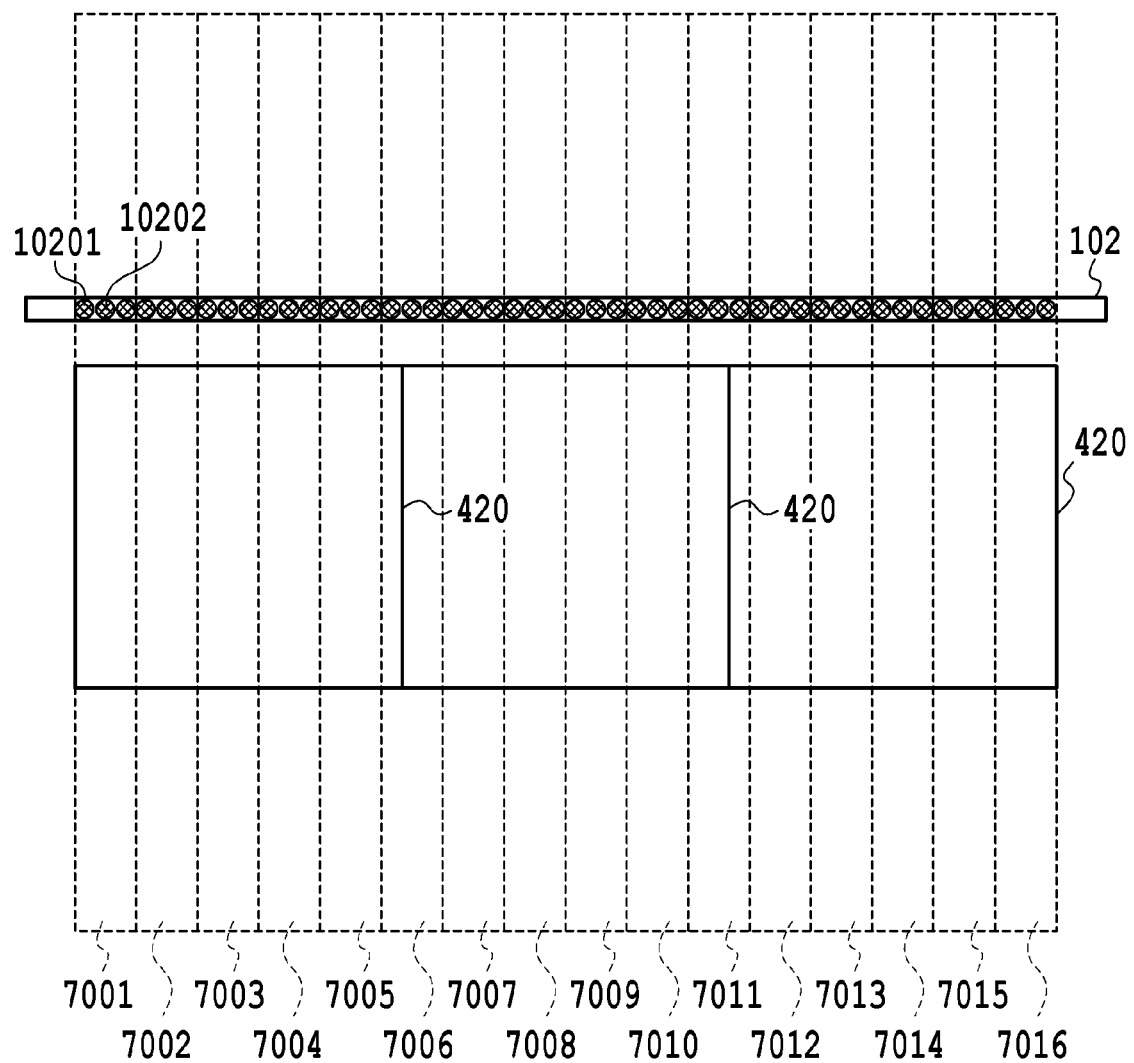
FIG. 9 is a diagram explanatory of an example of a preferred relationship between a processing unit width for HS processing and the size of a dither matrix in the first embodiment of the present invention.

FIG. 9 is a diagram explanatory of an example of a preferred relationship between an HS processing unit width and the size of a dither matrix in the present embodiment.

In FIG. 9, nozzles (10201, 10202, . . . ) in a print head 102 are arrayed in a density of 600 dpi. Moreover, a dither matrix 420 has a size of 16 pixels×16 pixels, and it is repeatedly used (WD=16 pixels).

In the meantime, each of rectangles 7001 to 7016 indicated by broken lines in FIG. 9 represents the HS processing unit, wherein $WHS = 3$ pixels.

As a consequence, the relationship of the least common multiple in the x direction (i.e., the nozzle array direction) is established:

$3 \times WD = 16 \times WHS$.

In this case, the cycle of the interference unevenness is 48 pixels (i.e., 3WD) as the least common multiple between WD and WHS.

Figure 11:
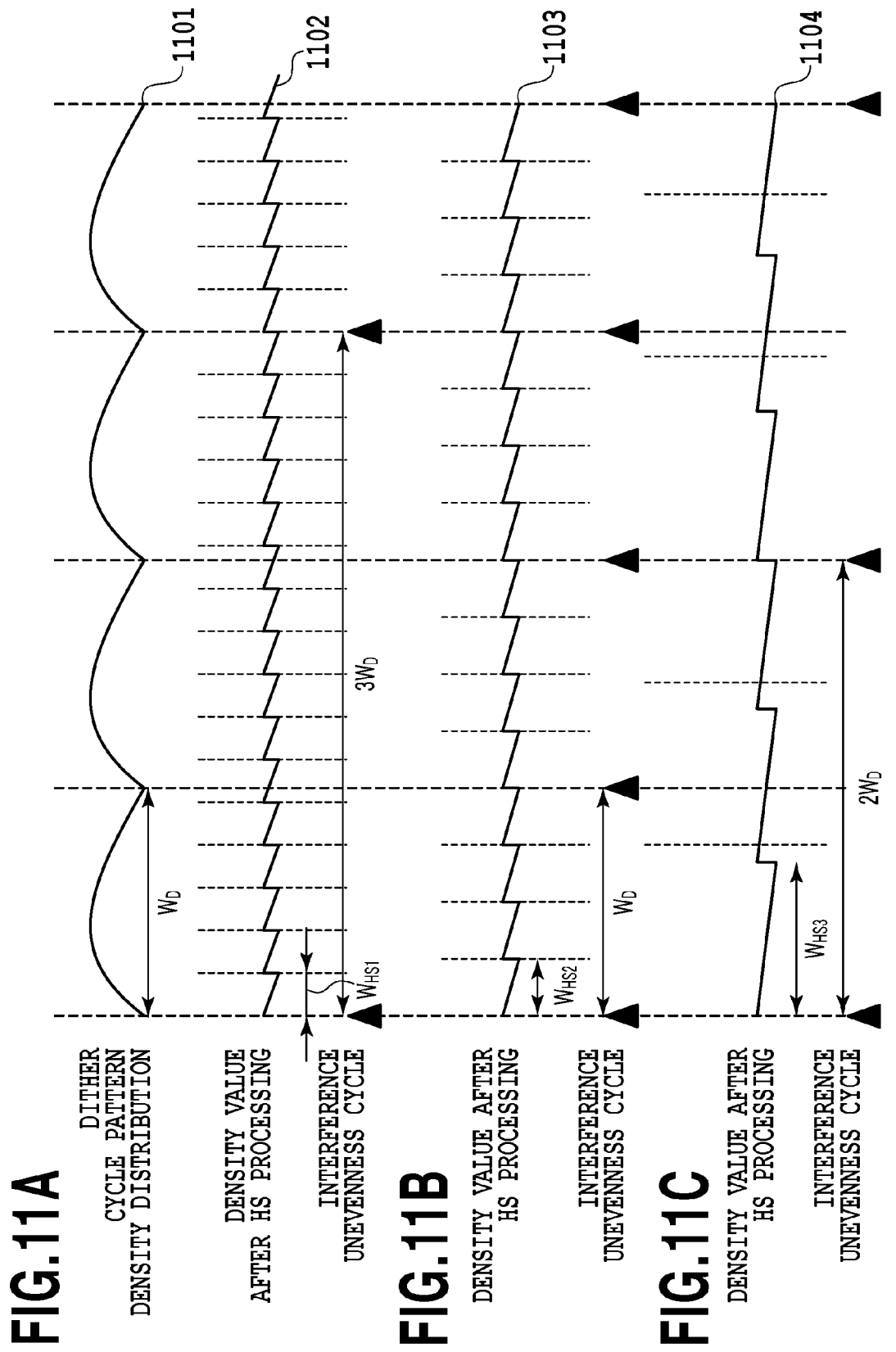
FIGS. 11A to 11C are diagrams explanatory of functions fulfilled by the first embodiment in which the size of the dither matrix is not the integral multiple of the HS processing unit width.

FIG. 11A illustrates that 48 pixels (i.e., 3WD) as the least common multiple according to the relationship of the size WD of the dither matrix to the processing unit width WHS become the cycle of the interference unevenness, as described above.

Figure 10:
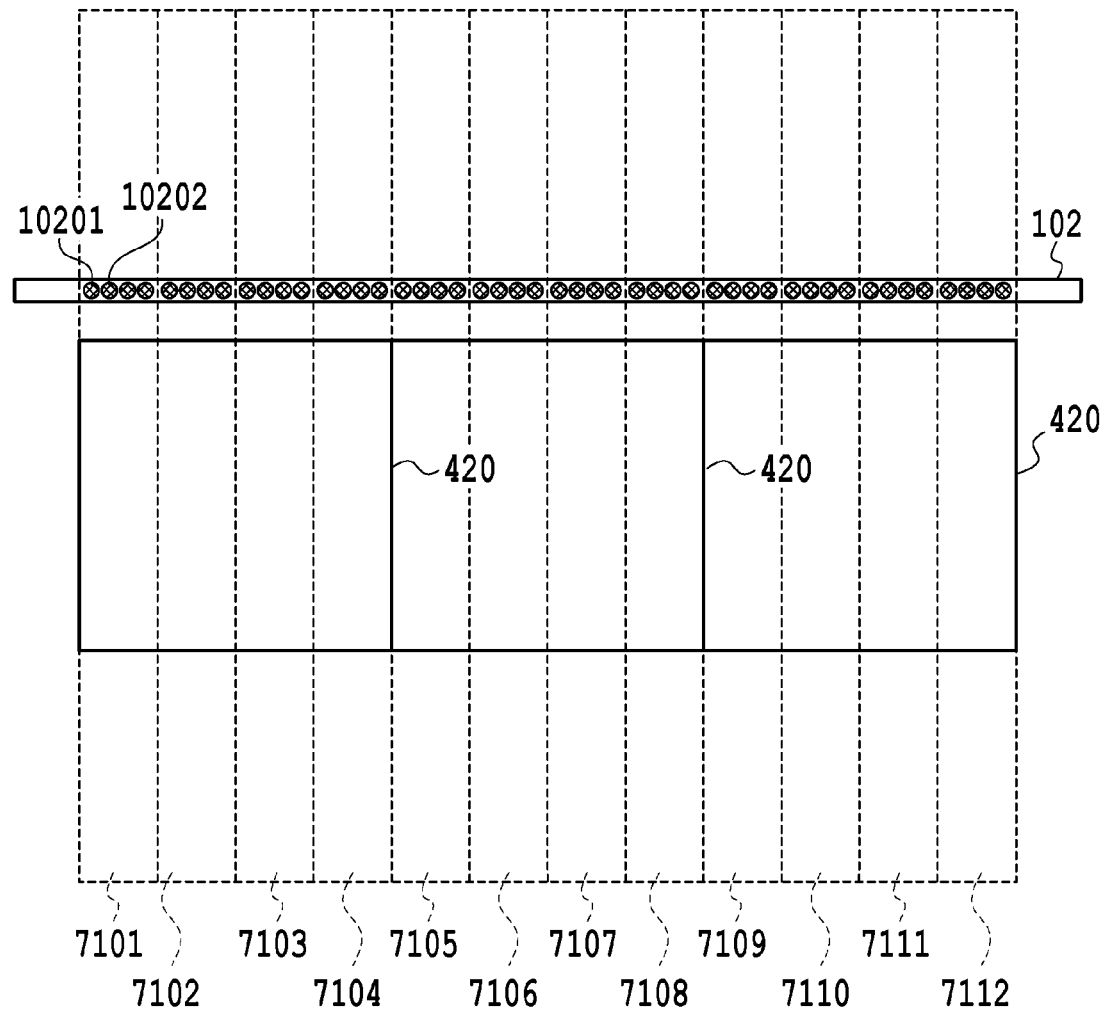
FIG. 10 is a diagram explanatory of a mutual relationship in a comparative example of the second embodiment, wherein the size of a dither matrix is an integral multiple of a processing unit width for HS processing.

In contrast, FIG. 10 is a diagram explanatory of a mutual relationship, wherein the size of a dither matrix is an integral multiple of an HS processing unit width. A print head 102, nozzles (10201, 10202, . . . ), and the size of a dither matrix 420 (i.e., 16 pixels) in FIG. 10 are the same as those in FIG. 9, and therefore, their explanations will be omitted below.

In FIG. 10, rectangles 7101 to 7112 indicated by broken lines represent HS processing units. In this example, $WHS = 4$ pixels.

Consequently, the relationship below is established in the x direction (i.e., the nozzle array direction):

$WD = 4 \times WHS$.

In this case, the cycle of the interference unevenness becomes WD (i.e., 16 pixels).

FIG. 11B is a chart illustrating, in particular, the cycle WD of the interference unevenness, which is a third of the cycle 3WD of the interference unevenness in the present embodiment illustrated in FIG. 11A.

As described above, the size of the dither matrix is not an integral multiple of the HS processing unit width, thereby prolonging the cycle of the interference unevenness more than the size of the dither matrix, like the present embodiment. In this manner, the interference unevenness can be hardly recognized, as described later with reference to FIG. 12.

Incidentally, although the cycle of the interference unevenness is tripled in the example illustrated in FIG. 11A, the fraction can take an integer of 2 or more according to the combination of the size of the dither matrix and the HS processing unit width. Like an example illustrated in FIG. 11C, if 2WD=3WHS3 with respect to a least common multiple, the cycle of the interference unevenness becomes 2WD. To sum up, the prolonged cycle of the interference unevenness may take any fractions as long as the prolonged cycle of the interference unevenness is hardly recognized, as described later with reference to FIG. 12, so that a fraction to be increased can become an integer of 2 or more according to specifications such as a print resolution in a print system.

Moreover, the size of the dither matrix is invariable whereas the HS processing unit width is variable in the examples illustrated in FIGS. 11A and 11C. To the contrary, the HS processing unit width may be invariable whereas the size of the dither matrix may be variable, so that the size of the dither matrix is made not to be an integral multiple of the HS processing unit width.

Figure 12:
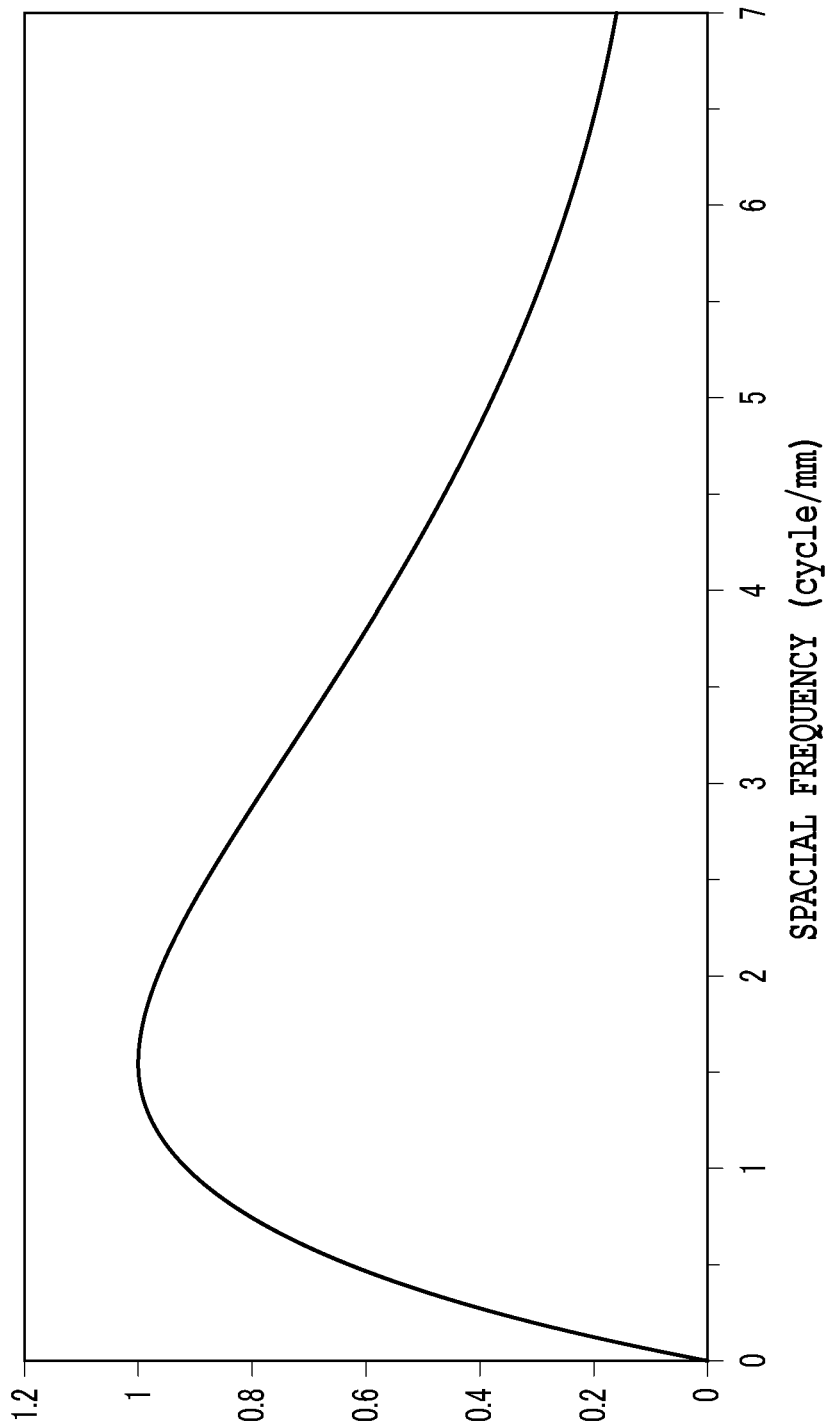
FIG. 12 is a graph illustrating a visual transmission function VTF to be used in expressing human visual characteristics.

Next, explanation will be made on the relationship of the cycle of the interference unevenness to its difficulty in recognizing. FIG. 12 is a graph illustrating a visual transmission function VTF with respect to a spacial frequency. The visual transmission function VTF illustrated in FIG. 12 expresses that variations in spacial frequency represented on a lateral axis induce variations in visual sensitivity on a vertical axis. From the visual transmission function VTF, it is found that the peak of the sensitivity appears near 1.5 cycle/mm, and further, the sensitivity is declined as the spacial frequency becomes smaller than 1.5 cycle/mm. In summary, it is found that the sensitivity is declined when a cyclic pattern having a spacial frequency of less than 1.5 cycle/mm is prolonged.

For example, a cyclic pattern of a dither matrix having a size of 16 pixels in 600 dpi has a spacial frequency of about 1.5 cycle/mm. This is equivalent to the cycle of the interference unevenness in the comparative example illustrated in FIG. 11B. In contrast, in the present embodiment, the spacial frequency of the interference unevenness ranges from about 1.5 cycle/mm to about 0.5 cycle/mm in the case where the prolonged cycle of the interference unevenness is tripled to 48 pixels. Therefore, the visual sensitivity is declined from about 1.0 to about 0.6. In this manner, the prolongation of the cycle of the interference unevenness enables the interference unevenness to be hardly recognized according to the present embodiment.

Figure 13:
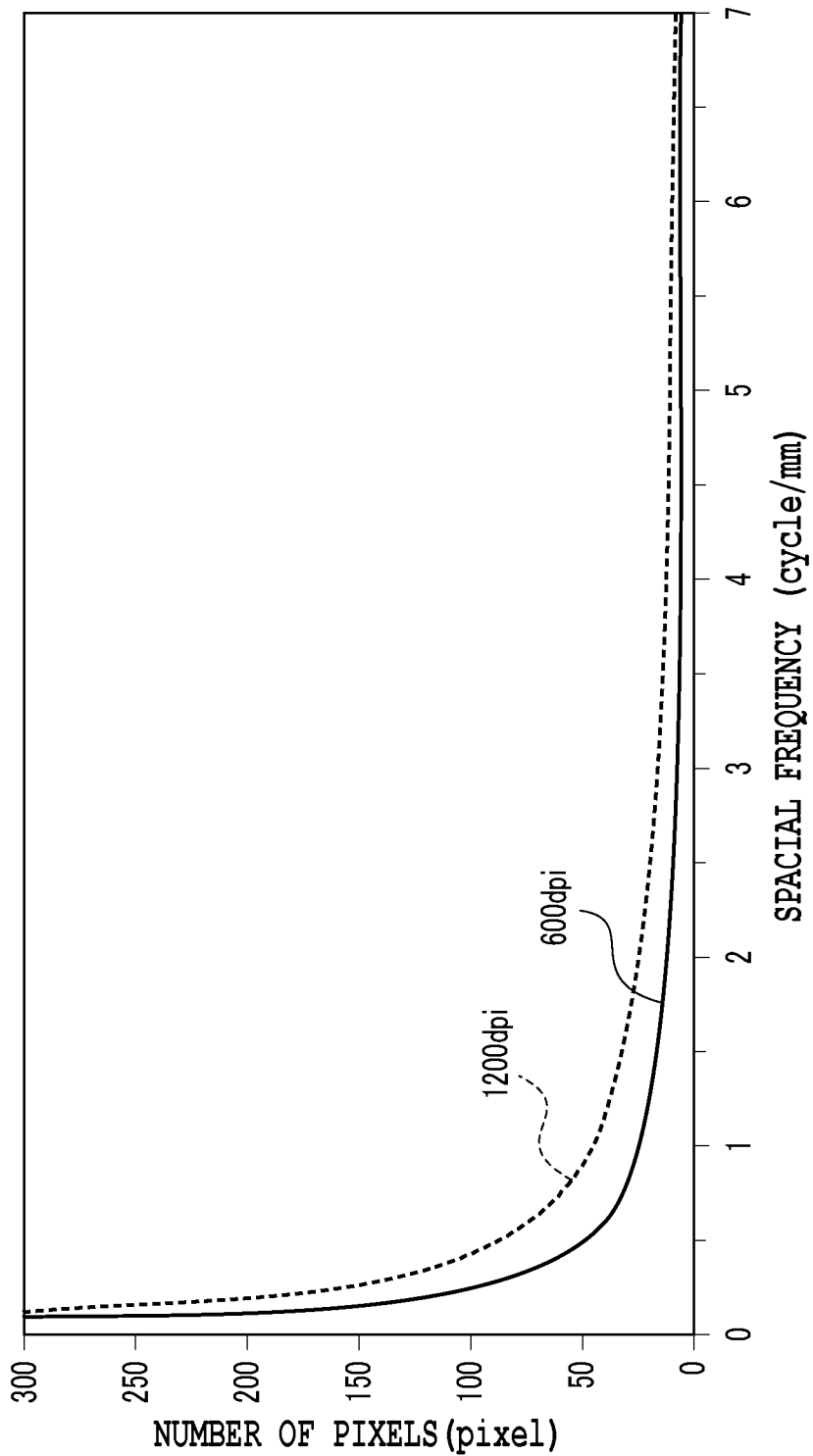
FIG. 13 is a graph illustrating a relationship between a spacial frequency and the number of pixels per cycle.

Here, as illustrated in FIG. 13, the number of pixels is varied according to a resolution even at the same spacial frequency. Consequently, the range of the cycle of the dither matrix whose sensitivity is declined due to the prolongation of the cycle may be varied according to the resolution. Moreover, the peak of the visual transmission function is varied according to an observation distance. Therefore, the range of the cycle of the dither matrix whose sensitivity is declined due to the prolongation of the cycle also may be varied according to the observation distance.

As described above, the size of the dither matrix is not an integral multiple of the HS processing unit width, so that the unevenness caused by the interference between the cyclic pattern of the size of the dither matrix and the density unevenness in the cycle of the HS processing unit width can be hardly recognized.

Second Embodiment

Figure 14:
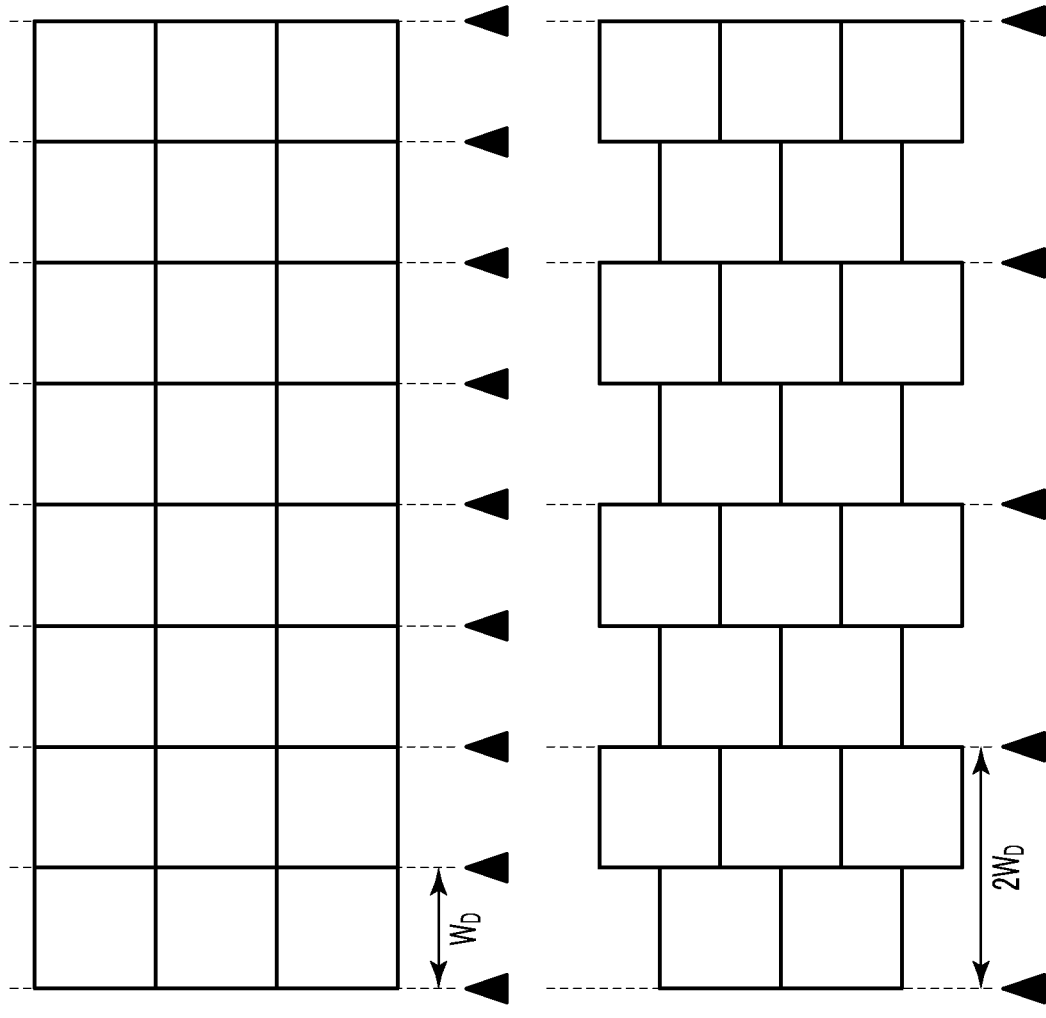
FIGS. 14A and 14B are diagrams illustrating one example of a relationship between the arrangement of dither matrixes and the cycle of interference unevenness in a second embodiment of the present invention.

One dither matrix is repeatedly used for a print image in a two-dimensional fashion. FIGS. 14A and 14B are diagrams explanatory of a relationship of the arrangement of dither matrixes to the cycle of interference unevenness.

When the dither matrixes are arranged, as illustrated in FIG. 14A, the cycle of the density pattern of each of the dither matrixes per se becomes WD, as described above by way of the first embodiment. In contrast, as illustrated in FIG. 14B, the dither matrixes that are applied adjacent to each other in the x direction (i.e., the nozzle array direction) are alternately shifted by a half of the size of the matrix in the y direction (i.e., a direction perpendicular to the nozzle array direction). In this manner, the pattern of the threshold arrangement becomes doubled, that is, 2WD in the x direction. Accordingly, the cycle of the density pattern of the dither matrix becomes 2WD. In general, the dither matrixes are shifted from each other by 1/m (m is a predetermined number of pixels) of the size of the matrix, so that the cycle of the density pattern of the dither matrix can become mWD.

Here, when a threshold repetition cycle in the x direction is designated by reference character WTH, it is assumed that the threshold repetition cycle in the x direction is not an integral multiple of the HS processing unit width in the present embodiment. Specifically, an inequality below is established:

$$WTH(mWD) \neq nWHS$$

(n is a natural number),
wherein the cycle of the interference unevenness becomes the least common multiple between WTH and WHS.

In contrast, when the threshold repetition cycle in the x direction is an integral multiple of the HS processing unit width, an equation below is established:

$$WTH(mWD) = nWHS,$$

wherein the cycle of the interference unevenness becomes WTH.

Figure 15:
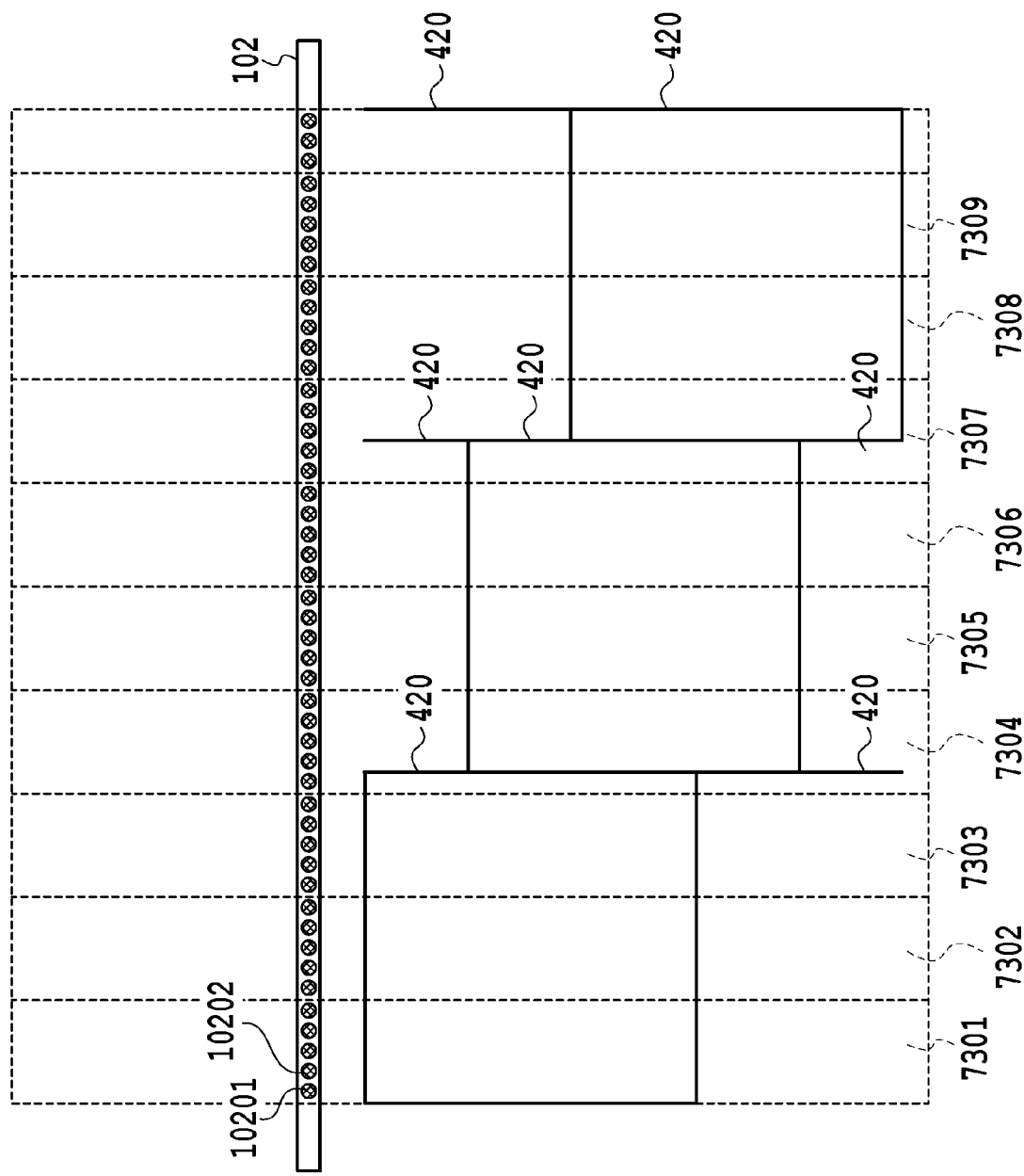
FIG. 15 is a diagram explanatory of an example of a preferred relationship between an HS processing width and a dither matrix threshold repetition cycle in the third embodiment.

FIG. 15 is a diagram explanatory of a preferred relationship of an HS processing unit width to a dither matrix size in the second embodiment of the present invention. Nozzles (10201, 10202, ...) in a print head 102 are arrayed in a density of 600 dpi. A dither matrix 420 has a size of 16 pixels×16 pixels in 600 dpi. The dither matrixes are alternately shifted by ⅓ of the matrix size from each other in the y direction (see FIG. 1) (here, WD=16 pixels). Therefore, $$WTH=48 \text{ pixels.}$$

Rectangles 7301 to 7309 indicated by broken lines in FIG. 15 represent the HS processing units. In FIG. 15, $$WHS=5 \text{ pixels.}$$

Thus, the relationship of the least common multiple in the x direction (i.e., the nozzle array direction) below is established:

$$5 \times WTH = 48 \times WHS.$$

In this case, the cycle of the interference unevenness becomes the least common multiple between WTH and WHS, that is, 240 pixels (5WTH).

In this case, the cycle of 48 pixels in 600 dpi is prolonged, and then, becomes five times, that is, 240 pixels. As illustrated in FIG. 12, the spacial frequency ranges from about 0.5 cycle/mm to about 0.1 cycle/mm. At this time, the sensitivity ranges from about 0.6 to about 0.17 from FIG. 12. In other words, the visual sensitivity is decreased. Consequently, the interference unevenness can be hardly recognized.

Figure 16:
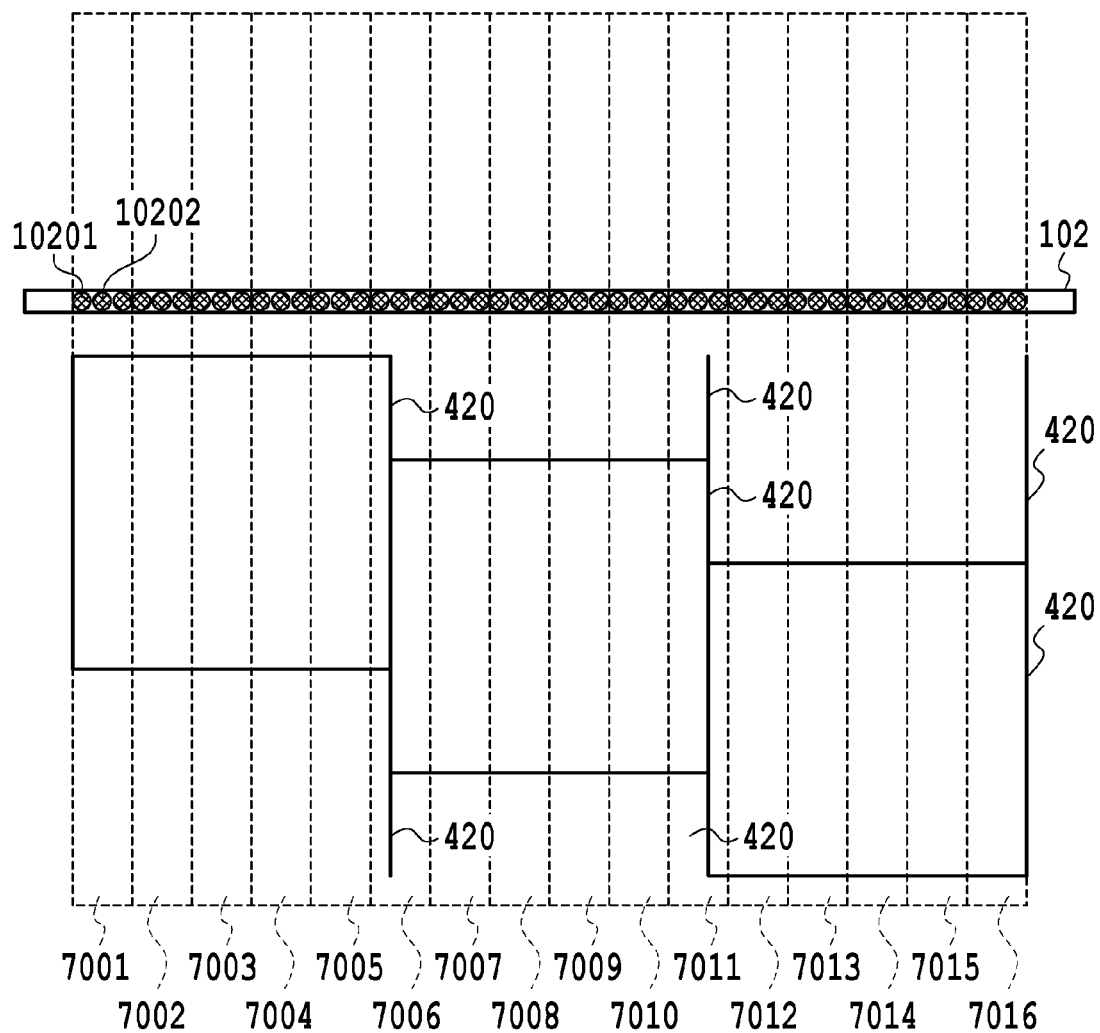
FIG. 16 is a diagram explanatory of an example of an unfavorable relationship between an HS processing width and a dither matrix threshold repetition cycle in a comparative example of the third embodiment.

In contrast, FIG. 16 is a diagram explanatory of an unfavorable relationship of an HS processing width to a dither matrix size in the second embodiment. Here, the details of a print head 102, nozzles (10201, 10202, ...), and a dither matrix 420 are the same as those illustrated in FIG. 15, and therefore, their explanations will be omitted below.

Rectangles 7001 to 7016 indicated by broken lines in FIG. 16 represent the HS processing units. In FIG. 16, $$WHS=3 \text{ pixels.}$$

Thus, the relationship in the x direction (i.e., the nozzle array direction) below is established:

$$WTH=16 \times WHS.$$

That is to say, the threshold repetition cycle becomes an integral multiple of the HS processing unit width. In this case, the cycle of the interference unevenness becomes WTH (i.e., 48 pixels), and therefore, the cycle of the interference unevenness cannot be prolonged.

As described above with reference to FIG. 13, the number of pixels is varied according to the resolution even at the same spacial frequency. As a consequence, the range of the threshold repetition cycle of the dither matrix whose sensitivity is declined due to the prolongation of the cycle may be varied according to the resolution. Moreover, the peak of the visual transmission function is varied according to the observation distance. Thus, the range of the threshold repetition cycle of the dither matrix whose sensitivity is declined due to the prolongation of the cycle also is varied according to the observation distance.

As described above, since the threshold repetition cycle of the dither matrix is not the integral multiple of the HS processing unit width according to the present embodiment, the unevenness caused by the interference between the threshold repetition cyclic pattern of the dither matrix and the density unevenness in the cycle of the HS processing unit width can be hardly recognized.

Incidentally, when the concept of the density pattern of the dither matrix according to the threshold arrangement in the second embodiment is applied to the first embodiment, it can be construed that the cycle of the density pattern according to the threshold arrangement is the same as the size of the dither matrix in the first embodiment.

Other Embodiments

Although the description has been given of the above-described embodiments in which the size of the dither matrix (or the cycle of the density pattern according to the threshold arrangement) is not the integral multiple of the HS processing unit width, the present invention is applicable to other embodiments. To the contrary, the present invention may be applied to an embodiment in which the HS processing unit width is not the integral multiple of the size of the dither matrix (or the cycle of the density pattern according to the threshold arrangement). That is to say, the present invention may be applied to any embodiments as long as the relationship that one of the size of the dither matrix (or the cycle of the density pattern according to the threshold arrangement) and the HS processing unit width is not an integral multiple of the other is established.

Additionally, although the description has been given of the above-described embodiments in which the dither matrix is used for binarization, the present invention is not limited to this mode. For example, 256-value image data may be quantized into 4-value data, and then, binarization may be carried out with a dot arrangement pattern corresponding to each of levels indicated by the 4-value data. Moreover, although the above-described embodiments have been described by way of the ink jet type printing apparatus, the present invention is not limited to this mode. The present invention may be applied to a printing apparatus having a system for forming dots by, for example, thermal transfer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-252267 filed on Nov. 16, 2012, which is hereby incorporated by reference herein in its entirety.

What is claimed is:

1. An image processing apparatus that generates print data used for performing printing of an image on a printing medium by using a printing element array in which a plurality of printing elements are arrayed, said apparatus comprising:
a correction unit configured to, for each of processing units corresponding to a plurality of printing element groups, respectively, which are obtained by dividing the plurality of printing elements in the printing element array, correct image data of an image which corresponds to the printing elements in the printing element group, according to print characteristics of the printing elements in the printing element group; and
a quantizing unit configured to quantize the image data corrected by said correction unit by using a dither matrix representing a plurality of thresholds that are respectively associated with data of pixels forming an image to be printed on an area having a predetermined size in an array direction of the plurality of printing elements in the print medium, wherein a plurality of areas are successively arranged in the array direction, and the dither matrix is used for each area having the predetermined size,
wherein a number of pixels in the area having the predetermined size in the array direction is larger than and not multiple of a number of pixels in the array direction corresponding to the plurality of printing elements in the printing element group.

2. The printing apparatus as claimed in claim 1, wherein a print head is provided with nozzles as the printing elements and ink is circulated in the print head in the array direction of the plurality of nozzles.

3. The image processing apparatus as claimed in claim 1, further comprising a print head provided with the printing element array.

4. The image processing apparatus as claimed in claim 1, wherein the plurality of printing elements are nozzles that have a print characteristic in which an ejection amount gradually increases from one end of the nozzles to the other end of the nozzles in the array direction.

5. The image processing apparatus as claimed in claim 1, wherein the correction unit corrects image data based on a result of measuring a measuring image printed by the plurality of printing elements.

6. The image processing apparatus as claimed in claim 1, wherein the correction unit corrects image data to reduce a difference in print densities between the printing element groups.

7. The image processing apparatus as claimed in claim 1, wherein the printing is performed on the print medium that is conveyed in a direction intersecting the array direction.

8. An image processing method for generating print data used for performing printing of an image on a printing medium by using a printing element array in which a plurality of printing elements are arrayed, said method comprising:
a correction step of, for each of processing units corresponding to a plurality of printing element groups, respectively, which are obtained by dividing the plurality of printing elements in the printing element array, correcting image data of an image, which corresponds to the printing elements in the printing element group, according to print characteristics of the printing elements in the printing element group; and
a quantizing step of quantizing the image data corrected in said correction step by using a dither matrix representing a plurality of thresholds that are respectively associated with data of pixels forming an image to be printed on an area having a predetermined size in an array direction of the plurality of printing elements in the print medium, wherein a plurality of areas are successively arranged in the array direction, and the dither matrix is used for each area having the predetermined size,
wherein a number of pixels in the area having the predetermined size in the array direction is larger than and not multiple of a number of pixels in the array direction corresponding to the plurality of printing elements in the printing element group.

9. An image processing apparatus that generates print data used for performing printing by using a printing element array in which a plurality of printing elements are arrayed, said apparatus comprising:
a correction unit configured to, for each of processing units corresponding to a plurality of printing element groups, respectively, which are obtained by dividing the plurality of printing elements in the printing element array, correct image data of a pixel, which corresponds to a printing element in the printing element group, according to print characteristics of the printing element in the printing element group; and
a quantizing unit configured to quantize the image data corrected by said correction unit by using a dither matrix, wherein one of a number of pixels expressing a cycle of a threshold arrangement pattern, which is formed with thresholds in the dither matrix, in an array direction of the plurality of printing elements and a number of pixels in the array direction corresponding to the plurality of printing elements in the printing element group as a processing unit is not an integral multiple of the other, and wherein the number of pixels expressing a cycle of the threshold arrangement pattern, which is formed with thresholds in the dither matrix, is a number of pixels in the array direction in single dither matrix.

10. An image processing apparatus that generates print data used for performing printing by using a printing element array in which a plurality of printing elements are arrayed, said apparatus comprising:

a correction unit configured to, for each of processing units corresponding to a plurality of printing element groups, respectively, which are obtained by dividing the plurality of printing elements in the printing element array, correct image data of a pixel, which corresponds to a printing element in the printing element group, according to print characteristics of the printing element in the printing element group; and a quantizing unit configured to quantize the image data corrected by said correction unit by using a dither matrix, wherein one of the number of pixels expressing a cycle of a threshold arrangement pattern, which is formed with thresholds in the dither matrix, in an array direction of the plurality of printing elements and the number of pixels in the array direction corresponding to the plurality of printing elements in the printing element group as a processing unit is not an integral multiple of the other, and wherein a number of pixels expressing a cycle of a threshold arrangement pattern, which is formed with thresholds in the dither matrix, is a number of pixels in a plurality of dither matrices in the array direction in the case that the plurality of dither matrices are applied so as to be arrayed in the array direction with the plurality of dither matrices being shifted by a predetermined number of pixels in a direction perpendicular to the array direction.

11. An image processing apparatus that generates print data used for performing printing by using a printing element array in which a plurality of printing elements are arrayed, said apparatus comprising:

a correction unit configured to, for each of processing units corresponding to a plurality of printing element groups, respectively, which are obtained by dividing the plurality of printing elements in the printing element array, correct image data of a pixel, which corresponds to the printing element in the printing element group, according to print characteristics of the printing element in the printing element group; and a quantizing unit configured to quantize the image data corrected by said correction unit by using a dither matrix, representing a plurality of thresholds that are respectively associated with data of pixels forming an image to be printed on an area having a predetermined size in an array direction of the plurality of printing elements in the print medium, wherein the predetermined size in the array direction is larger than and not a multiple of a length corresponding to the plurality of printing elements in the printing element group as the processing unit in the array direction.

* * * * *